(12) United States Patent
Cheng

(10) Patent No.: US 11,232,282 B2
(45) Date of Patent: Jan. 25, 2022

(54) CONTROL CIRCUIT, DISPLAY SYSTEM, AND RELATED METHOD OF CONTROLLING DISPLAY PANEL

(71) Applicant: NOVATEK Microelectronics Corp., Hsin-Chu (TW)

(72) Inventor: Huan-Teng Cheng, Hsinchu (TW)

(73) Assignee: NOVATEK Microelectronics Corp., Hsin-Chu (TW)

( * ) Notice: Subject to any disclaimer, the term of this patent is extended or adjusted under 35 U.S.C. 154(b) by 0 days.

(21) Appl. No.: 16/999,019

(22) Filed: Aug. 20, 2020

(65) Prior Publication Data

US 2021/0056286 A1 Feb. 25, 2021

Related U.S. Application Data

(63) Continuation-in-part of application No. 16/921,921, filed on Jul. 6, 2020, and a continuation-in-part of application No. 16/851,043, filed on Apr. 16, 2020.

(Continued)

(51) Int. Cl.
*G06K 9/00* (2006.01)
*G06F 1/3234* (2019.01)
(Continued)

(52) U.S. Cl.
CPC ....... *G06K 9/00087* (2013.01); *G06F 1/3231* (2013.01); *G06F 1/3265* (2013.01); *G06K 9/0004* (2013.01)

(58) Field of Classification Search
USPC ...................................................... 345/156
See application file for complete search history.

(56) References Cited

U.S. PATENT DOCUMENTS 9,720,639 B1 * 8/2017 Morgan .............. G06F 3/04883
2013/0021289 A1 * 1/2013 Chen .................... H01L 51/5253
345/174

(Continued)

FOREIGN PATENT DOCUMENTS

CN 109409070 A 3/2019
CN 109885998 A 6/2019
(Continued)

OTHER PUBLICATIONS

Cheng, the specification, including the claims, and drawings in the U.S. Appl. No. 16/851,043, filed Apr. 16, 2020.

*Primary Examiner* — Chineyere D Wills-Burns
(74) *Attorney, Agent, or Firm* — Winston Hsu

(57) ABSTRACT

A control circuit, coupled to a system processor and a display panel, includes a touch control circuit, a display control circuit and a fingerprint control circuit. The touch control circuit is configured to detect a finger touch on the display panel. The display control circuit is configured to control the display panel to display at least one light spot which indicates a position of the finger touch. The fingerprint control circuit is configured to perform fingerprint sensing through at least one fingerprint sensor corresponding to the position of the finger touch, and send fingerprint image data to the system processor, wherein the fingerprint image data corresponds to sensing signals received from the at least one fingerprint sensor. Wherein, each of the above steps is performed by the control circuit by keeping a display part of the system processor in a sleep status.

78 Claims, 23 Drawing Sheets

Related U.S. Application Data

(60) Provisional application No. 63/026,126, filed on May 17, 2020, provisional application No. 62/890,052, filed on Aug. 21, 2019, provisional application No. 62/889,572, filed on Aug. 21, 2019.

(51) Int. Cl.
*G06F 1/3231* (2019.01)
*G06F 1/3206* (2019.01)

(56) References Cited

U.S. PATENT DOCUMENTS

| | | | |
|---|---|---|---|
| 2014/0101737 A1 | 4/2014 | Rhee | |
| 2015/0286268 A1* | 10/2015 | Komatsu | G06F 3/04184 345/173 |
| 2016/0202779 A1* | 7/2016 | Jiang | G06F 3/03547 455/566 |
| 2016/0253540 A1* | 9/2016 | Han | G06K 9/0002 382/124 |
| 2017/0200037 A1* | 7/2017 | Hong | G06F 3/041661 |
| 2017/0344148 A1* | 11/2017 | Han | G06F 3/04886 |
| 2018/0035923 A1* | 2/2018 | Kang | G06K 9/0002 |
| 2018/0101715 A1 | 4/2018 | Lee | |
| 2018/0164943 A1* | 6/2018 | Hung | G06F 3/04166 |
| 2018/0218195 A1* | 8/2018 | Sheik-Nainar | G06K 9/001 |
| 2018/0224999 A1 | 8/2018 | Lee | |
| 2018/0260600 A1* | 9/2018 | Kremin | G06K 9/0002 |
| 2018/0329560 A1 | 11/2018 | Kim | |
| 2018/0348949 A1* | 12/2018 | Kim | G06K 9/0002 |
| 2018/0349669 A1* | 12/2018 | Kim | G06K 9/22 |
| 2019/0019048 A1* | 1/2019 | Deng | G06F 21/32 |
| 2019/0065808 A1 | 2/2019 | Zhang | |
| 2019/0354226 A1* | 11/2019 | Choi | G06F 1/3265 |

FOREIGN PATENT DOCUMENTS

| | | |
|---|---|---|
| CN | 110070006 A | 7/2019 |
| TW | 201839650 A | 11/2018 |
| TW | I662452 B | 6/2019 |

\* cited by examiner

CONTROL CIRCUIT, DISPLAY SYSTEM, AND RELATED METHOD OF CONTROLLING DISPLAY PANEL

CROSS REFERENCE TO RELATED APPLICATIONS

This application is a continuation-in-part application of U.S. application Ser. No. 16/851,043, filed on Apr. 16, 2020 and a continuation-in-part application of U.S. application Ser. No. 16/921,921, filed on Jul. 6, 2020, and claims the benefit of U.S. Provisional Application No. 63/026,126, filed on May 17, 2020. U.S. application Ser. No. 16/851,043 further claims the benefit of U.S. Provisional Application No. 62/890,052, filed on Aug. 21, 2019, and U.S. application Ser. No. 16/921,921 further claims the benefit of U.S. Provisional Application No. 62/889,572, filed on Aug. 21, 2019. The contents of these applications are incorporated herein by reference.

BACKGROUND OF THE INVENTION

1. Field of the Invention

The present invention relates to a method of controlling a display panel and its related control circuit, and more particularly, to a control circuit capable of performing dark screen fingerprint unlocking to unlock the display panel based on fingerprint recognition.

2. Description of the Prior Art

Fingerprint recognition technology is widely applied in a variety of electronic products such as a mobile phone, laptop, tablet, personal digital assistant (PDA), and portable electronics, for realizing identity recognition. The fingerprint sensing allows a user to perform identity recognition conveniently, where the user only needs to put his/her finger on a fingerprint sensing pad or area to login the electronic device instead of entering long and tedious username and password.

Conventionally, if a user needs to wake up an electronic device (e.g., a mobile phone) from a dark screen mode, the user may apply double-click or any similar touch gestures on the screen to realize the operation. If the screen is locked and thus requires fingerprint recognition to unlock itself, the unlocking operation may be more complex with combination of the fingerprint recognition function and touch sensing operation. For example, the fingerprint control circuit should communicate with the system processor for determination and comparison of the fingerprint's features, and the user should move his/her finger to a designated position on the display panel, allowing the sensing signals to be read out. The redundant operations and time consumption decrease the sensing speed and thus reduce the user experience of fingerprint unlocking. Thus, there is a need for improvement of many aspects such as speed and user experience of a fingerprint unlocking process.

SUMMARY OF THE INVENTION

It is therefore an objective of the present invention to provide a method of controlling a display panel and a related control circuit and display system, capable of improving fingerprint unlocking process in many aspects.

An embodiment of the present invention discloses a control circuit coupled to a system processor and a display panel. The control circuit comprises a touch control circuit, a display control circuit and a fingerprint control circuit. The touch control circuit is configured to detect a finger touch on the display panel. The display control circuit is configured to control the display panel to display at least one light spot which indicates a position of the finger touch. The fingerprint control circuit is configured to perform fingerprint sensing through at least one fingerprint sensor corresponding to the position of the finger touch, and send fingerprint image data to the system processor, wherein the fingerprint image data corresponds to sensing signals received from the at least one fingerprint sensor. Wherein, each of the above steps can be performed by the control circuit by keeping a display part of the system processor in a sleep status.

Another embodiment of the present invention discloses a method of controlling a display panel for a control circuit. The control circuit is coupled to a system processor. The method comprises steps of: detecting a finger touch on the display panel; controlling the display panel to display at least one light spot which indicates a position of the finger touch; performing fingerprint sensing through at least one fingerprint sensor corresponding to the position of the finger touch; and sending fingerprint image data to the system processor, wherein the fingerprint image data corresponds to sensing signals received from the at least one fingerprint sensor. Wherein, each of the above steps can be performed by the control circuit by keeping a display part of the system processor in a sleep status.

Another embodiment of the present invention discloses a display system, which comprises a display panel, a system processor and a control circuit. The control circuit can be coupled to the system processor and configured to control the display panel. The control circuit is configured to: detect a finger touch on the display panel, control the display panel to display at least one light spot which indicates a position of the finger touch, perform fingerprint sensing through at least one fingerprint sensor corresponding to the position of the finger touch, and send fingerprint image data to the system processor, wherein the fingerprint image data corresponds to sensing signals received from the at least one fingerprint sensor. Wherein, each of the above steps can be performed by the control circuit by keeping a display part of the system processor in a sleep status.

Another embodiment of the present invention provides a control circuit, capable of being coupled to a system processor and a display panel. The control circuit includes a touch control circuit, configured to detect a finger touch on the display panel; a display control circuit, configured to control the display panel to display at least one light spot which indicates a position of the finger touch without intervention of a display part of the system processor; and a fingerprint control circuit, configured to perform fingerprint sensing through at least one fingerprint sensor corresponding to the position of the finger touch, and send fingerprint image data to the system processor, wherein the fingerprint image data corresponds to sensing signals received from the at least one fingerprint sensor.

These and other objectives of the present invention will no doubt become obvious to those of ordinary skill in the art after reading the following detailed description of the preferred embodiment that is illustrated in the various figures and drawings.

DETAILED DESCRIPTION

In order to improve the convenience of fingerprint recognition, control circuits and related display systems and methods of the present invention are capable of performing dark screen fingerprint unlocking process. The dark screen fingerprint unlocking process may be performed by keeping a display part of a system processor in a sleep status.

In some embodiments, when a screen (or a display panel) of an electronic device is dark, which may be different from an always-on display (AOD) operation, and when at least one finger touches the screen, a fingerprint recognition can be performed. If the recognition is successful, the screen can then be lighted up to show the recognition result or any indications of unlocking. Subsequently, a user interface (UI) can be displayed to interact with a user.

In some embodiments, a large area or even a whole area of a display panel can be utilized for sensing the fingerprint of a finger. In such embodiments, a touched position of the finger can be used by the control circuit to determine a position for sensing the fingerprint of the finger.

Since the screen is not required to be lighted up to activate the fingerprint sensing operation, and/or the finger may touch the screen only once without being required to leave the screen during the fingerprint sensing operation, the whole fingerprint recognition time can be shortened and user experience can therefore be greatly enhanced.

In some embodiments, fingerprint signals may be sensed at a touched position on a screen (or a display panel). To achieve this purpose, there may be a sensor array, which may be disposed in or under the display panel. The sensor array may be implemented as one or more sensing pixels, each may have at least one photodiode for sensing the light to generate a sensing signal and at least one transistor for forwarding the sensing signal to a control circuit. In such implementations, an optical fingerprint sensing operation may be realized by using the photodiode(s) to sense the light reflected from the touch finger.

In general, the control circuit applied to deal with the touch sensing operation and fingerprint sensing operation of a display device having touch and fingerprint sensing functions may be a fingerprint, touch and display integration (FTDI) circuit. In an embodiment, the FTDI circuit may be implemented as an integrated circuit integrated in a single chip. Alternatively, the FTDI circuit may be a combination of multiple chips composed of control circuits with different functions. To facilitate the illustration, the control circuit will generally be called "FTDI circuit" hereinafter.

Figure 1:
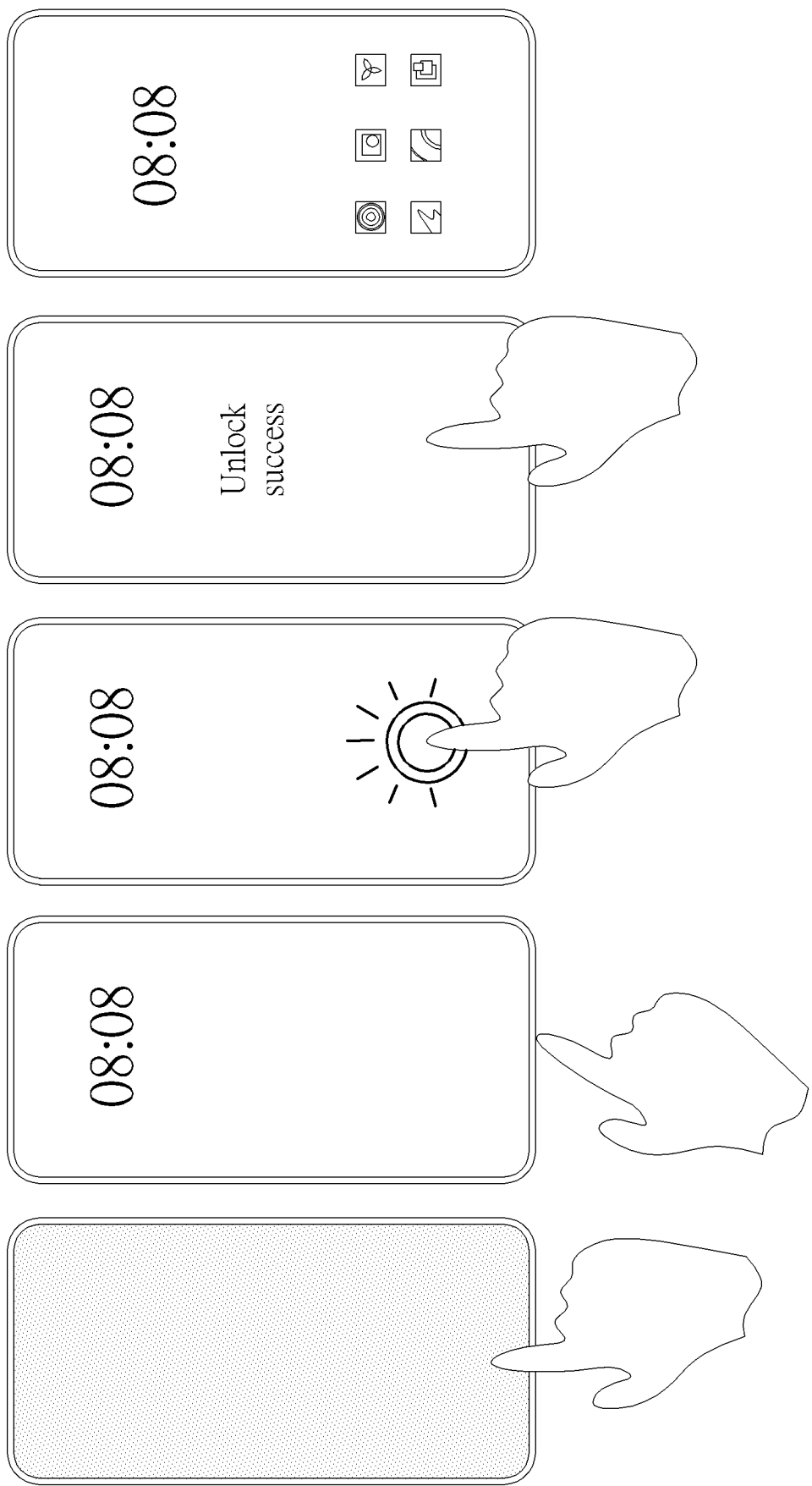
FIG. 1 illustrates a light screen fingerprint unlocking process.

In general, the display panel may have a screen disposed with touch sensor and fingerprint sensor, to be capable of sensing touch signals and fingerprint signals. A control circuit may be applied to control the display driving, touch sensing, and fingerprint sensing functions on the display panel. FIG. 1 illustrates a light screen fingerprint unlocking process. When the display panel is in a sleep mode or standby mode, the display function may be disabled to save power consumption. If a finger touch on the screen is detected, the touch sensing part of the control circuit may inform a system processor of the information of finger touch. In response, the system processor can light up the screen to display and send image data to control the screen to show an icon indicating a designated position to receive the fingerprint image.

Further, since the system processor takes over the display control after receiving the information of finger touch, the system processor may reset and restart the operations of the control circuit. During the reset or restart process, the touch sensing part may restart the touch sensing operation by reestablishing a calibration baseline for canceling the background noises on the touch sensor. In such a situation, if the finger stays on the screen during the reset or restart process, the touch information of this finger may be regarded as a background noise and filtered out; hence, the fingerprint information may not be successfully obtained by the control circuit.

Therefore, when the display function of the display panel is woken up, the touch finger is required to leave the touch screen, in order to correct the touch. In such a situation, the user has to move his/her finger away from the touch screen and then put it back onto the designated position of the touch screen for fingerprint sensing. Such redundant action and time reduce the user experience of fingerprint recognition. Further, since the system processor is required to send image signals to the display panel to show an icon to indicate the position for receiving the fingerprint signals, more power consumption is necessary to realize the display function.

Figure 2:
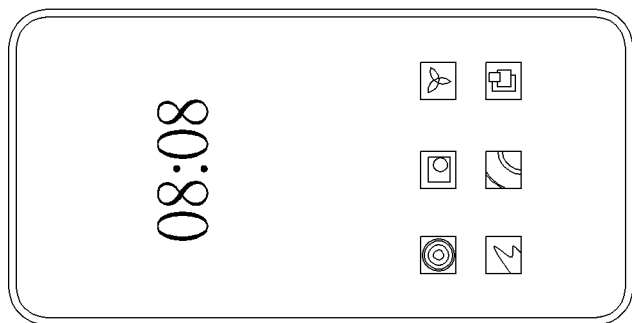
FIG. 2 is a schematic diagram of a method of unlocking a screen based on fingerprint recognition according to an embodiment of the present invention.
Figure 2:
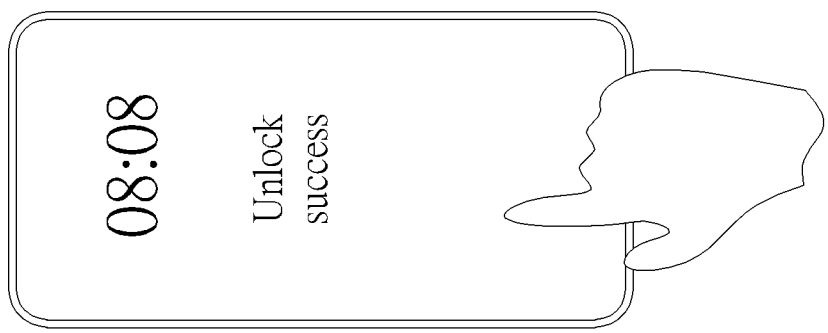
Figure 2:
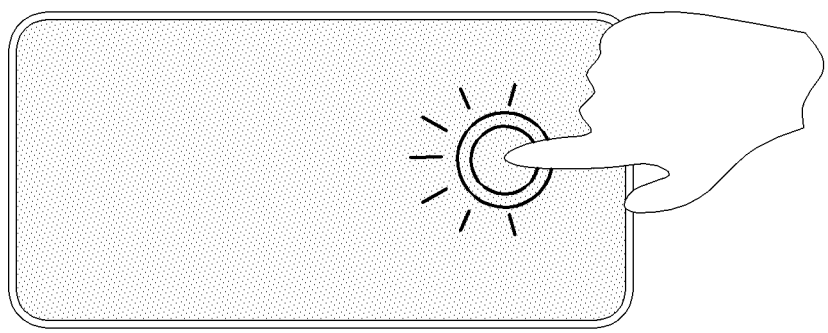

Please refer to FIG. 2, which is a schematic diagram of a method of unlocking a screen based on fingerprint recognition according to an embodiment of the present invention. As shown in FIG. 2, the mobile phone may be in dark screen originally. In such a situation, no image is sent from the system processor to the FTDI circuit to drive the panel to display the image. Therefore, a display part of the system processor can be in a sleep status. When a touch of a finger is detected to wake up the panel, fingerprint sensing and recognition can be performed to realize the unlocking operation. With the fingerprint sensing function, the user may put his/her finger on an arbitrary position of the touch screen, and the fingerprint sensor disposed at the touched position may start performing fingerprint sensing. After the fingerprint recognition is successfully completed, the panel may be lighted up to show the information of successful recognition or unlocking and then enter the homepage or any appropriate user interface according to design requirements. In other words, the display part of the system processor cannot be in the sleep status after a successful recognition. Conversely, if the recognition fails, the panel may show the information regarding a failed unlocking or remain dark.

Embodiments of the disclosure apply a dark screen fingerprint unlocking operation. The FTDI circuit may use the internal clock display to keep the screen dark and display at least one light spot by keeping the display part of the system processor in the sleep status. The at least one light spot can operate as a light source for optical fingerprint sensing and the FTDI circuit may determine the position and/or more image information of the light spot according to the position of finger touch. Therefore, the display function of the system processor may be disabled or turned off during the dark screen fingerprint unlocking period. In other words, the operations of black scanning and light spotting are controlled by the FTDI circuit without intervention of the system processor. Subsequently, the system processor can start fingerprint recognition based on the fingerprint images received from the FTDI circuit. It is noted that in different embodiments, a fingerprint part of the system processor may be awaked or notified by the FTDI circuit before fingerprint sensing is started, before fingerprint sensing is completed, or after fingerprint sensing is completed.

During the above dark screen fingerprint unlocking process, the FTDI circuit does not require the finger to leave the screen to sense the touch of the finger, which is different from a light screen fingerprint unlocking process requires the finger to leave to detect an occurrence of a fingerprint touch operation. Compared to the light screen optical fingerprint unlocking scheme as shown in FIG. 1, the whole fingerprint sensing and recognition process is faster and more convenient, and the user experience is also more satisfactory.

Figure 3:
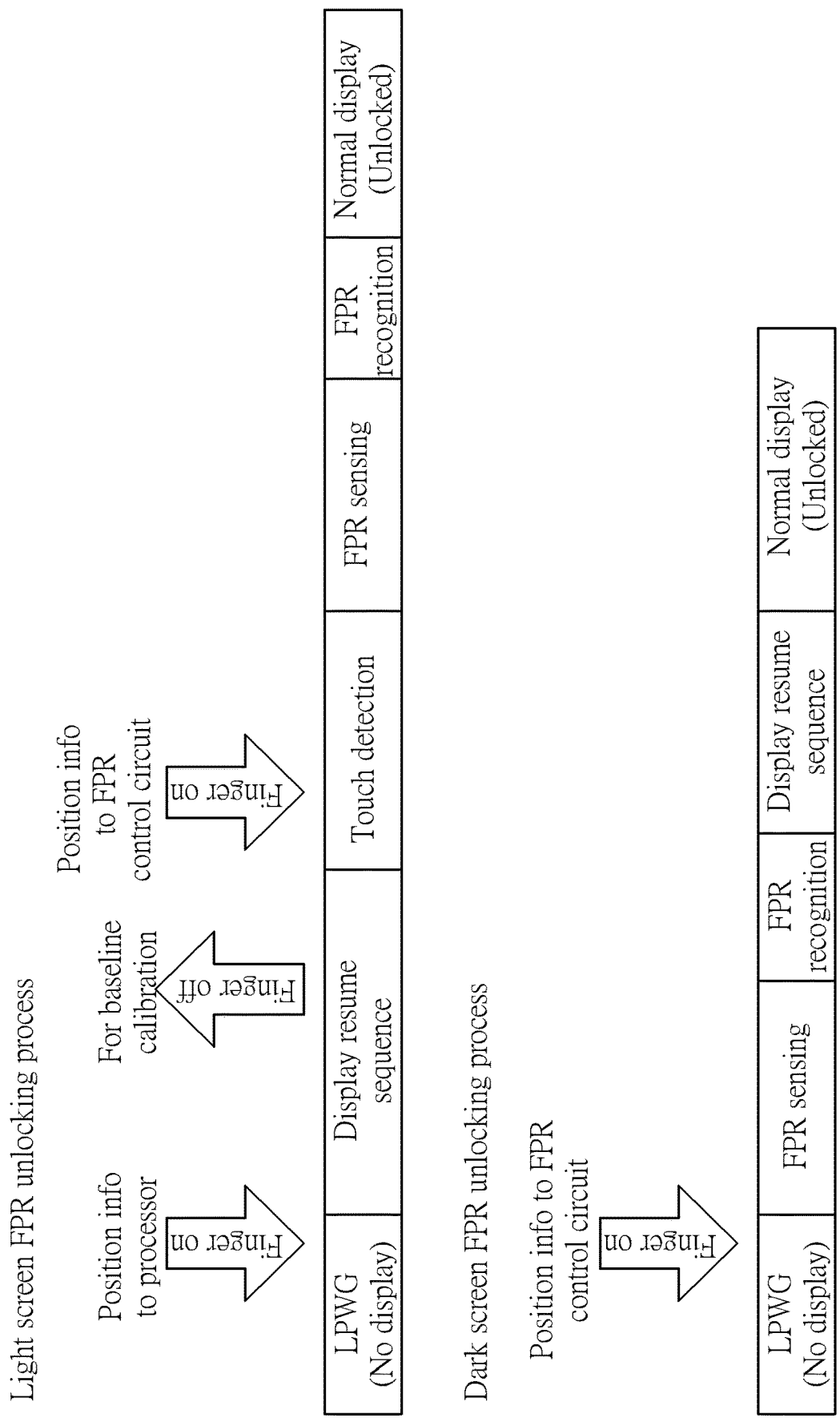
FIG. 3 illustrates the comparison of timing relationship between a light screen fingerprint unlocking process and a dark screen fingerprint unlocking process according to some embodiments of the present invention.

FIG. 3 illustrates the comparison of timing relationship between a light screen fingerprint unlocking process and a dark screen fingerprint unlocking process according to some embodiments of the present invention.

The upper part of FIG. 3 illustrates the light screen fingerprint unlocking process. First, the control circuit operates in a low power wakeup gesture (LPWG) mode, in which a touch control circuit of the control circuit periodically performs touch sensing operation while the display control and fingerprint sensing functions of the control circuit may be disabled. In such a situation, no image is displayed to achieve the purpose of power saving. When a finger touch on the screen is detected (i.e., finger on) and the touch is determined to be valid, the touch control circuit may wake up a system processor and send the position information of the touch finger to the system processor. The control circuit also starts a display resume sequence (i.e., a sequence representing resetting and exiting a sleep mode), which is a resume, restart or power-on procedure for entering a normal display mode, in which the display panel will display normally based on the image information received from the system processor, e.g., through the mobile industry processor interface (MIPI). Therefore, a display part of the system processor is not in a sleep status anymore.

It is noted that during the display resume sequence, the touch control circuit may perform baseline calibration for touch operation; hence, it is required that the finger should temporally leave the screen, so as to prevent the position information of the finger from being filtered out in calibration and be able to detect the occurrence of a fingerprint touch. Subsequently, the finger may return to the screen, and the touch control circuit may detect the touch, i.e., correctly capture the finger's position information (e.g., coordinate information), and thereby inform the fingerprint control circuit to start fingerprint sensing according to the touched position. Then the fingerprint recognition may be performed by the system processor based on image data received from the fingerprint control circuit obtained through fingerprint sensing. After the system processor determines that the fingerprint recognition is successful by executing related algorithms, the system processor may control the display panel to unlock the screen and show appropriate information such as the homepage.

The lower part of FIG. 3 illustrates the dark screen fingerprint unlocking process according to some embodiments of the present invention, which is much simpler than the light screen process. In the LPWG mode, no image can be displayed and only touch sensing can be performed periodically under dark screen. When a finger touch on the touch screen is detected (i.e., finger on) and the touch is determined to be valid, the touch control circuit of the FTDI circuit may notify the fingerprint control circuit of the FTDI circuit to perform fingerprint sensing. The related information such as coordinate (i.e., position) information of the finger may be sent to the fingerprint control circuit of the FTDI circuit. After the fingerprint sensing is completed, the fingerprint control circuit of the FTDI circuit may send the fingerprint image data to the system processor, and the system processor performs recognition through related algorithms based on the fingerprint image data. Subsequently, if the fingerprint recognition indicates a successful result, the FTDI circuit may start the display resume sequence to wake up the display part of the system processor, which controls the display panel to unlock the screen and display normally (i.e., entering a light screen mode). Therefore, during the fingerprint unlocking process of the embodiment, the finger may keep staying on the touch screen, which leads to a better user experience. It is noted that the display resume sequence may be started earlier or even removed, as will be explained in other embodiments.

Figure 4:
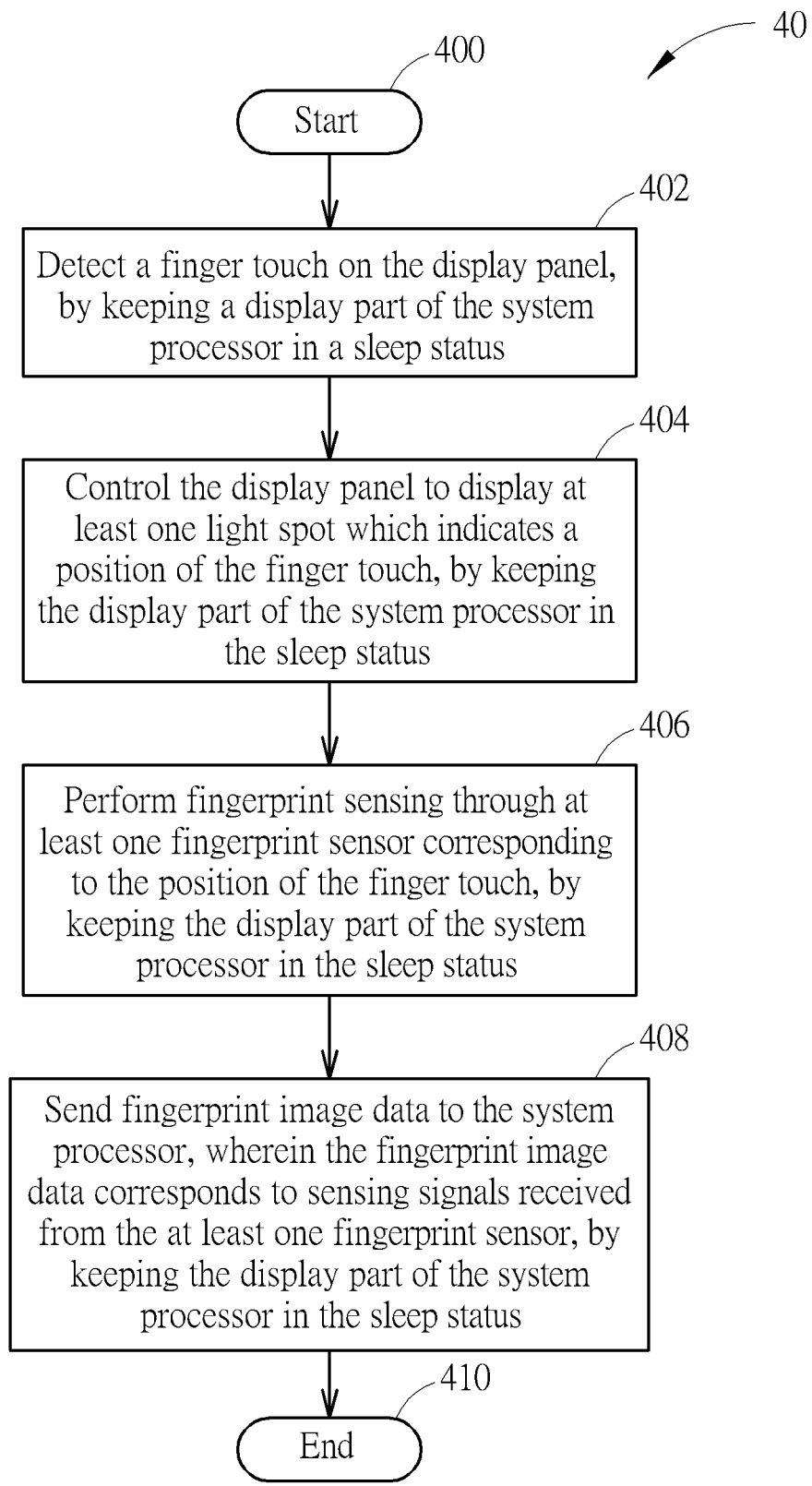
FIG. 4 is a flowchart of a fingerprint unlocking process according to an embodiment of the present invention.

Please refer to FIG. 4, which is a flowchart of a fingerprint unlocking process 40 according to an embodiment of the present invention. The fingerprint unlocking process 40 may be implemented by a control circuit, e.g. an FTDI circuit, which is coupled to a system processor and configured to control a display panel capable of sensing touches and fingerprints. As shown in FIG. 4, the fingerprint unlocking process 40 includes the following steps:

Step 400: Start.

Step 402: Detect a finger touch on the display panel, by keeping a display part of the system processor in a sleep status.

Step 404: Control the display panel to display at least one light spot which indicates a position of the finger touch, by keeping the display part of the system processor in the sleep status.

Step 406: Perform fingerprint sensing through at least one fingerprint sensor corresponding to the position of the finger touch, by keeping the display part of the system processor in the sleep status.

Step 408: Send fingerprint image data to the system processor, wherein the fingerprint image data corresponds to sensing signals received from the at least one fingerprint sensor, by keeping the display part of the system processor in the sleep status.

Step 410: End.

According to the fingerprint unlocking process 40, the touch control circuit can first detect a finger touch on the display panel. This may be implemented as a LPWG operation as mentioned above, where the finger touch is detected under the dark screen mode without image display so that power consumption may be saved. After the finger touch is detected, the touch control circuit may wake up the fingerprint control circuit and the display control circuit of the FTDI circuit. The display control circuit thereby controls the display panel to show light spot(s) which indicate(s) the position of the finger touch. The light spot(s) may be served to provide a light source for exposure, which emits light to be reflected by the finger, to realize optical fingerprint sensing. The fingerprint control circuit thereby performs fingerprint sensing through at least one fingerprint sensor corresponding to the position of the finger touch, where the fingerprint sensor disposed below the touched position may be enabled to sense the reflected light. After receiving sensing signals from the fingerprint sensor, the fingerprint control circuit may convert the sensing signals into corresponding digital data to be sent to the system processor. Note that each of the above steps can be performed by the FTDI circuit by keeping the display part of the system processor in the sleep status. This means that before the fingerprint control circuit completes the fingerprint sensing, the display part of the system processor can be kept in the sleep status; that is, no image information related to the light spot(s) or any other display image need to be received from the system processor by the FTDI circuit during the fingerprint unlocking process. The image information related to the at least one light spot can include position information of the at least one light spot. The image information related to the at least one light spot can further include any other image information such as size, brightness, shape, pattern of the at least one light spot and etc. The image information related to the at least one light spot may be determined by the FTDI circuit, for example, by at least one of the touch control circuit and the display control circuit.

Figure 5:
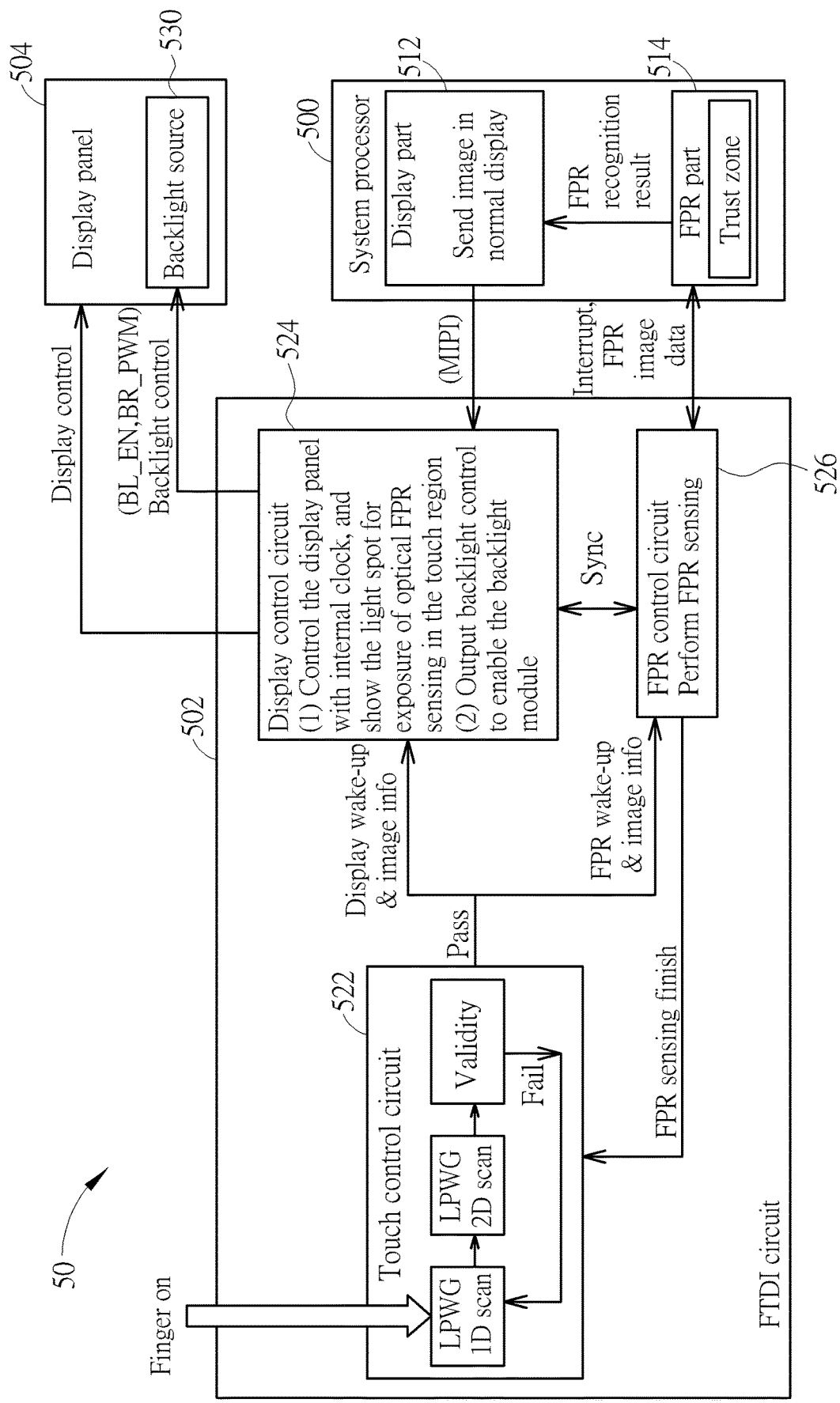
FIG. 5 illustrates the implementations and operations of the FTDI circuit according to an embodiment of the present invention.

FIG. 5 illustrates the implementations and operations of the FTDI circuit in more detail according to an embodiment of the present invention. As shown in FIG. 5, a display system 50 includes a system processor 500, an FTDI circuit 502 and a display panel 504. The system processor 500 is configured to provide image data to be displayed on the display panel 504, and also configured to provide the fingerprint recognition function. More specifically, the system processor 500 includes a display part 512 and a fingerprint part 514. The display part 512 is configured to provide the image data to the FTDI circuit 502 to control the FTDI circuit 502 to display image based on the image data, and the fingerprint part 514 is configured to perform fingerprint recognition based on fingerprint image data received from the FTDI circuit 502, e.g., through a trust zone. The display part 512 may send the image data to the FTDI circuit 502 through a MIPI. The fingerprint part 514 may communicate with the FTDI circuit 502 through another interface, e.g., a serial peripheral interface (SPI).

The FTDI circuit 502, coupled between the system processor 500 and the display panel 504, is configured to control the touch sensing, fingerprint sensing and image display functions on the display panel 504. More specifically, the FTDI circuit 502 includes a touch control circuit 522, a display control circuit 524 and a fingerprint control circuit 526. The touch control circuit 522 is configured to perform touch sensing on the display panel 504 which may be a touch display panel capable of sensing fingerprints. In an embodiment, the touch control circuit 522 is capable of the LPWG function as described above, which detects the touch finger under the dark screen mode in order to wake up the display panel 504 and related display functions. The display control circuit 524 is configured to control the display operations of the display panel 504 by outputting the image signals and scanning the gate lines. The fingerprint control circuit 526 is configured to perform fingerprint sensing on the display panel 504. The fingerprint control circuit 526 may receive the sensing signals through at least one fingerprint sensor disposed in or under (or anyway along with) the display panel 504, and correspondingly send the fingerprint image data to the fingerprint part 514 of the system processor 500 to perform fingerprint recognition.

In this embodiment, the display panel 504 may be a liquid crystal display (LCD) panel, which includes a backlight source 530 capable of generating backlight for display. The backlight source 530 may be controlled by the display control circuit 524 of the FTDI circuit 502. During the dark screen fingerprint unlocking process of the present invention, the backlight source 530 may be controlled by the display control circuit 524 without being instructed by the system processor 500, especially the display part 512 of the system processor 500. More specifically, in the embodiments of the present invention, the display control circuit 524 of the FTDI circuit 502 may be capable of controlling the backlight source 530 to be enabled for display operations, unlike a conventional LCD panel where the display function can only be enabled and controlled by the system processor. Therefore, in the display panel 504, the light spot may be shown without enabling the display part 512 of the system processor 500. Since the display part 512 of the system processor 500 remains in the sleep and power saving status, the fingerprint unlocking process is regarded as in the dark screen mode, and thus called the dark screen fingerprint unlocking.

Please continue to refer to FIG. 5. The touch control circuit 522 may be configured with several detection modes, including a 1-dimensinoal (1D) scan mode, 2-dimensional (2D) scan mode, and validity detection. The 1D scan mode and the 2D scan mode may be regarded as the LPWG mode. Under the 1D scan mode, the 1D touch scan may be performed to determine the existence of finger touch. If there is no finger touch detected on the touch screen, the 1D touch scan may proceed periodically. The 1D touch scan refers to scan for detecting whether there is a touch on the touch screen of the display panel 504 without obtaining the detailed information such as coordinate point of the finger touch; hence, lower power consumption may be achieved since it simply detects the existence of finger touch without consuming power to calculate the detailed information of the finger touch. For example, multiple touch sensors in a wide area may perform sensing simultaneously to detect the existence of a finger touch without considering the position of the finger touch.

After a finger touch on the display panel 504 is detected, the touch control circuit 522 may start to perform 2D touch scan to detect and determine more detailed information such as the position (e.g. coordinate point) of the touch finger. In the 2D scan mode, the coordinate and/or radius of the touch finger may be determined. For example, under the capacitive touch sensing scheme, the capacitance value of several sensing electrodes closer to the touch area may be acquired, to calculate the radius of the touch area and the coordinate of the touch finger. The determination associated with detailed information of the touch finger in the 2D scan mode consumes more power than the 1D scan mode that only detects whether there is a touch on the screen.

Based on the image information of the finger touch, the touch control circuit 522 may determine whether the finger touch is valid so as to determine whether to notify the fingerprint control circuit 526 to start performing fingerprint sensing. In an embodiment, the finger touch may be determined to be valid or not based on the touch sensing area and/or the touch signal strength. For example, if the radius, area and/or range of the touch sensing area are greater than a predetermined threshold, the finger touch may be determined to be a valid touch event; and/or if the maximum touch sensing signal, the total sensing amount and/or the finger contact time are greater than a predetermined threshold, the finger touch may be determined to be a valid touch event.

Figure 6:
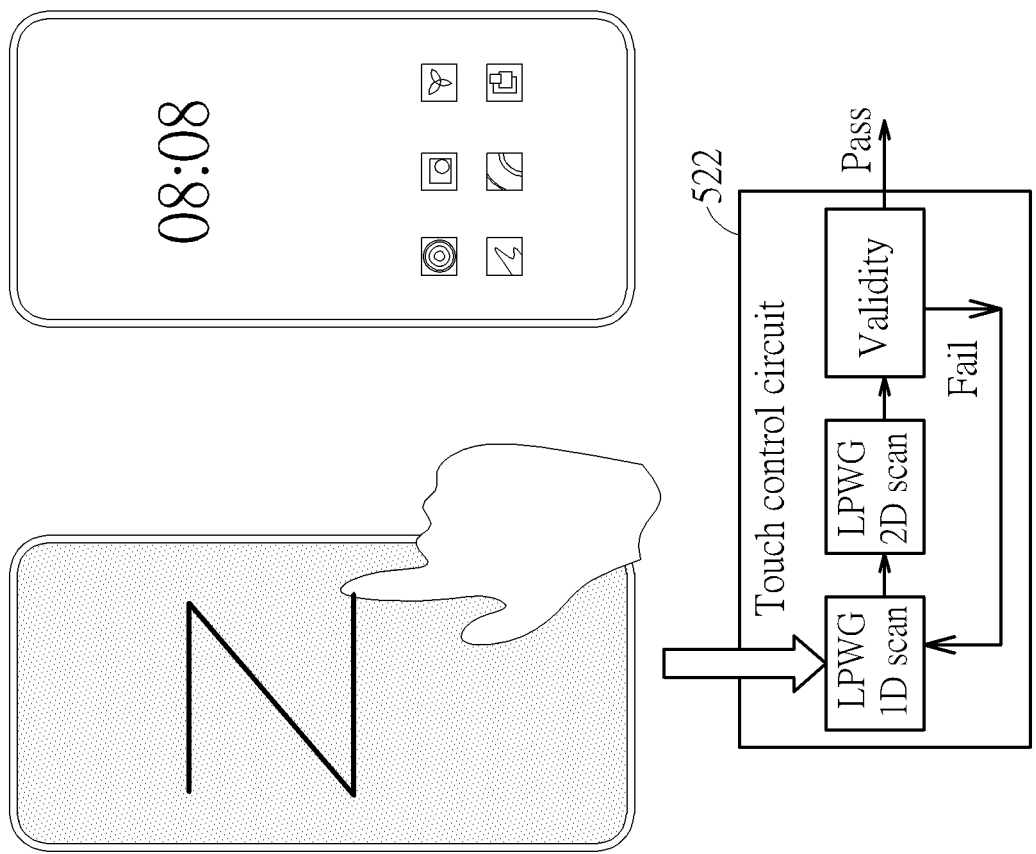
FIG. 6 is a schematic diagram of determining the validity of the finger touch based on a touch gesture according to an embodiment of the present invention.

Alternatively or additionally, the touch control circuit 522 may further determine the validity of the finger touch based on a predetermined touch gesture. Please refer to FIG. 6, which is a schematic diagram of determining the validity of the finger touch based on a touch gesture according to an embodiment of the present invention. The touch control circuit 522 may be configured with one or several touch gestures for triggering the dark screen fingerprint unlocking process by notifying the display control circuit 524 to perform light spotting and notifying the fingerprint control circuit 526 to start performing fingerprint sensing. The finger touch will be determined to be valid if the finger touch matches a predetermined touch gesture (such as a Z-shaped touch gesture as shown in FIG. 6). The validity test associated with specific touch gesture(s) can prevent the dark screen fingerprint unlocking from being false triggered due to an accidental touch. In the embodiment as shown in FIG. 6, the touch control circuit 522 may determine to start the dark screen fingerprint unlocking process if the finger touch matches the Z-shaped touch gesture; hence, the display control circuit 524 and the fingerprint control circuit 526 may start the operations such as light spotting and fingerprint sensing on the coordinate point of the last position of the finger.

In the embodiments of the present invention, the touch control circuit 522 may determine the validity of finger touch based on various touch behaviors, which should not be a limitation of the scope of the present invention.

If the finger touch passes the validity test, the touch control circuit 522 may awake or notify the display control circuit 524 to display the light spot(s) and also awake or notify the fingerprint control circuit 526 to perform fingerprint sensing. On the other hand, if the finger touch fails to pass the validity test, the touch control circuit 522 can return to the 1D or 2D scan mode to perform detection.

Figure 7:
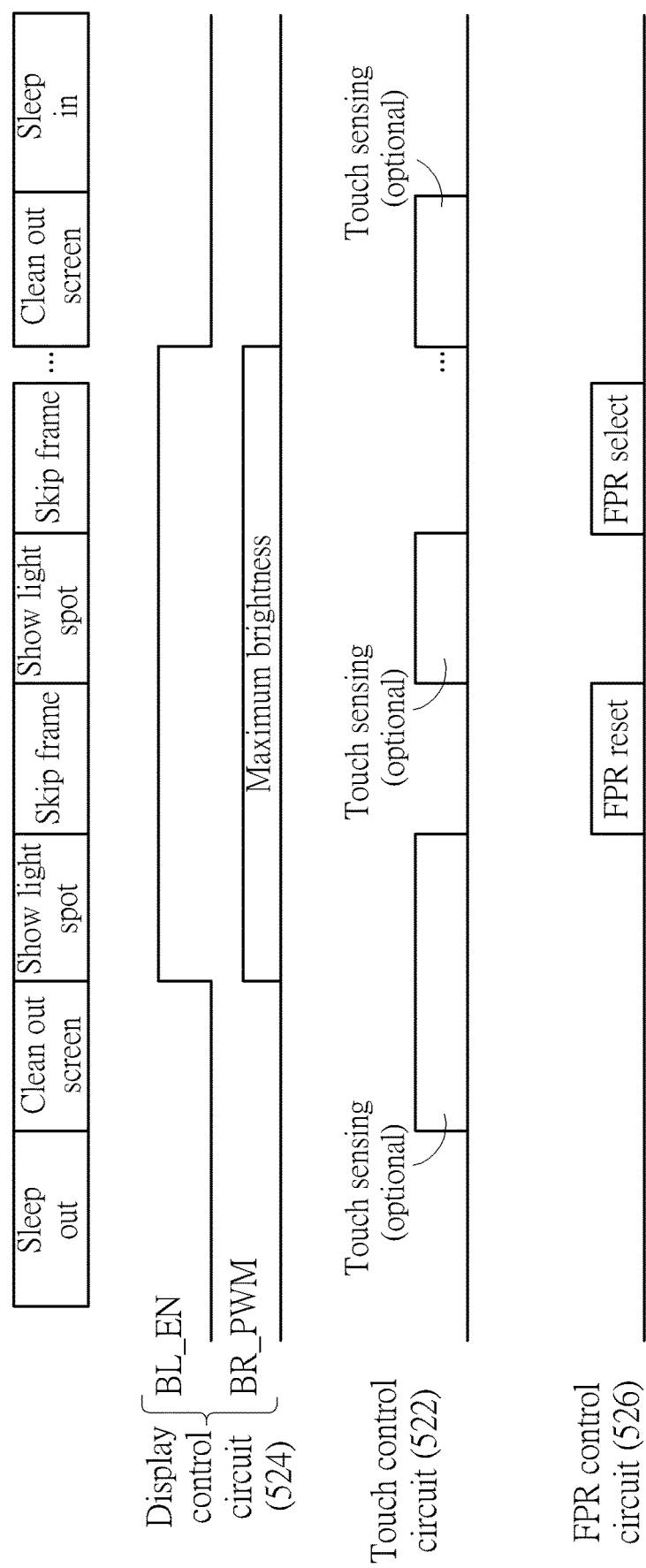
FIG. 7 illustrates the timing diagram of a dark screen fingerprint sensing period according to an embodiment of the present invention.

FIG. 7 illustrates the timing diagram of a dark screen fingerprint sensing period according to an embodiment of the present invention. Please refer to FIG. 7 with reference to FIG. 4. As shown in FIG. 7, the dark screen fingerprint sensing period may start with a sleep out sequence (for exiting the sleep mode) and end with a sleep in sequence (for entering the sleep mode). When the finger touch is determined to be valid, the FTDI circuit 502 can perform the sleep out sequence to wake up the display control circuit 524 and the fingerprint control circuit 526. Therefore, the display control circuit 524 may clean out the screen first, and then start to show at least one light spot. In detail, the display control circuit 524 may receive the image information such as the coordinate point and/or radius of the finger touch from the touch control circuit 522, so as to control the display panel 504 to show the light spot at an appropriate position or even having an appropriate size, while scanning the rest region of the screen to be black.

Please note that the display control circuit 524 can control the display panel 504 to show the light spot without being instructed by the system processor 500. Therefore, the display panel 504 may show the light spot only based on the image information received from the display control circuit 524, where the image information may include the position information of the light spot determined from the touch sensing result of the touch control circuit 522, and/or the image information of the light spot that may be predetermined in the FTDI circuit 502. Without intervention of the system processor 500, the display control circuit 524 may control the light spotting and black scanning with an internal clock of the FTDI circuit 502. The internal clock may coordinate and synchronize the operations of the touch control circuit 522, the display control circuit 524 and the fingerprint control circuit 526, to achieve the time division control between the display, touch and fingerprint sensing functions, as shown in FIG. 7. Accordingly, the display part 512 of the system processor 500 can be kept in a sleep status.

In this embodiment, the display panel 504 may be an LCD panel that displays images based on light emission of the backlight source 530. In some embodiments, the display control circuit 524 is configured to control the backlight source 530 in order to display at least one appropriate light spot. In detail, the display control circuit 524 may send a backlight enable signal BL_EN to enable the backlight source 530, where the backlight enable signal BL_EN may be implemented with a two-state control pin as shown in FIG. 7. In order to facilitate the optical fingerprint sensing based on the exposure of light spotting, the display control circuit 524 may further send a brightness control signal BR_PWM to the backlight source 530, to entirely turn on the backlight source 530 to show the maximum brightness. The maximum brightness can maximize the fingerprint peak-to-valley information carried on the sensing signals. Note that the maximum brightness is only one of various implementations of the present invention, and the brightness may be controlled flexibly according to system requirements. For example, in order to improve the visual effect during fingerprint sensing, the light emission of the backlight source 530 may be turned on/off slowly by dimming. In the embodiments of the present invention, the display control circuit 524 should be able to control the operations of the backlight source 530 without intervention of the system processor 500. Accordingly, the display part 512 of the system processor 500 can be kept in the sleep status.

While the light spot is displayed, the touch control circuit 522 may optionally perform touch sensing, in order to determine whether the finger stays on the touch screen. Also, during the display process, one or several skip frames may be inserted for fingerprint sensing; that is, the display and fingerprint sensing operations are performed based on time division to avoid mutual interferences. The fingerprint sensing operations may be generally classified into reset and select steps (also including an exposure step), which may be allocated to the skip frames in an appropriate manner. The detailed operations of fingerprint sensing may be well known by those skilled in the art, and will not be narrated herein. The timing relations of the display periods and the fingerprint sensing periods may be well controlled through the internal clock of the FTDI circuit 502.

Figure 8:
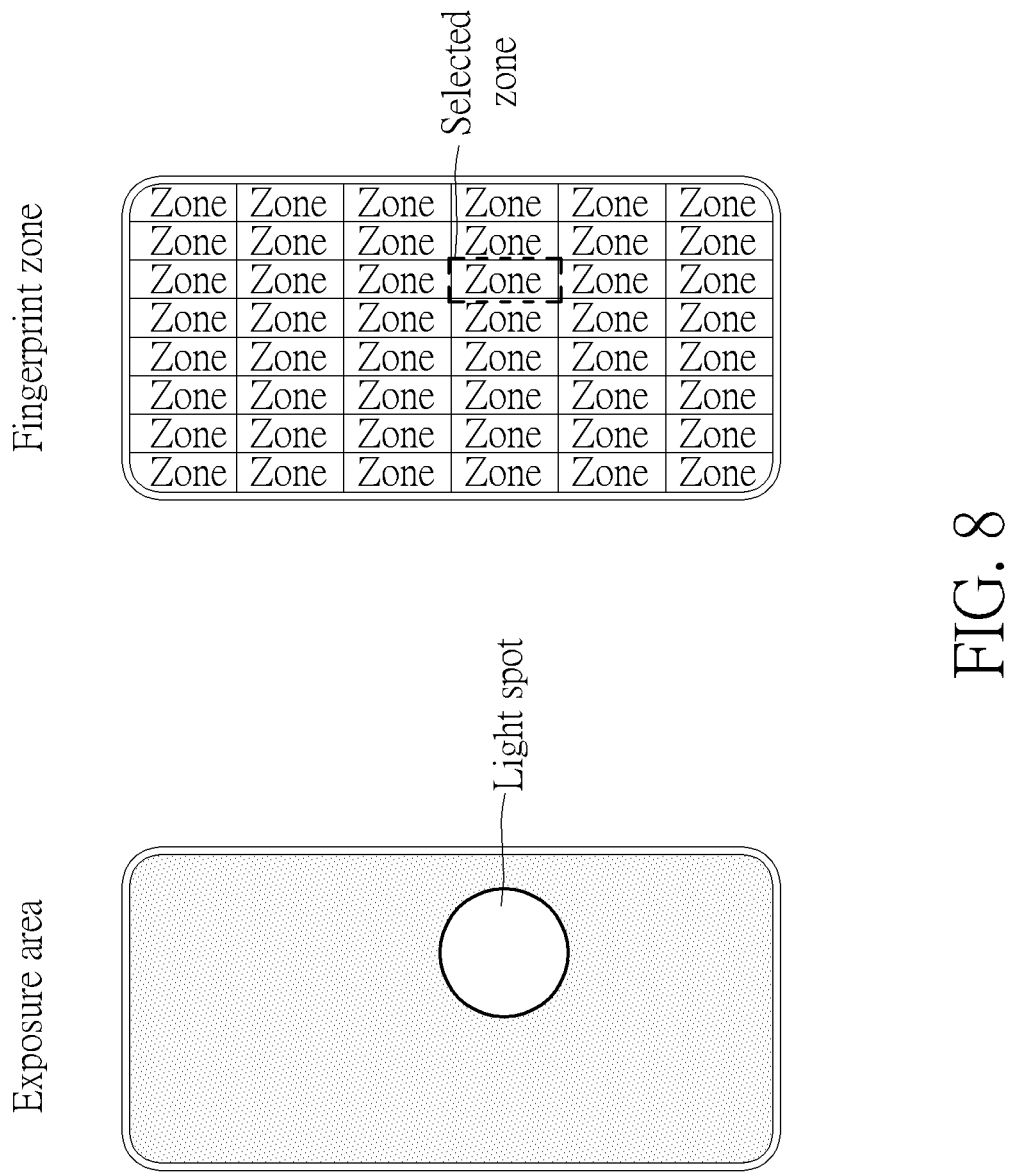
FIG. 8 is a schematic diagram showing that the display control circuit and the fingerprint control circuit operate based on the image information received from the touch control circuit according to an embodiment of the present invention.

As mentioned above, the touch control circuit 522 may provide the information of the finger touch for the display control circuit 524, allowing the display control circuit 524 to control the display of light spot. The touch control circuit 522 may also provide the information of the finger touch for the fingerprint control circuit 526, allowing the fingerprint control circuit 526 to perform fingerprint sensing. FIG. 8 shows an embodiment that the display control circuit 524 and the fingerprint control circuit 526 operate based on the image information received from the touch control circuit 522. In this embodiment, the fingerprint sensor disposed in or under or anyway along with the display panel 504 may be defined to have multiple zones. The image information provided by the touch control circuit 522 may indicate that the fingerprint sensor(s) corresponding to one or several zones covering the touch position of the finger should be turned on or activated or instructed to sense fingerprint and generate fingerprint sensing signals. Correspondingly, the display control circuit 524 may control the display panel 504 to show the light spot at the touch position for exposure. Furthermore, the size of the light spot may also correspond to the radius or area of finger touch detected by the touch control circuit 522. Meanwhile, the display control circuit 524 may scan black (i.e., to show black images) at the rest region of the screen without having any touch event detected.

Figure 9:
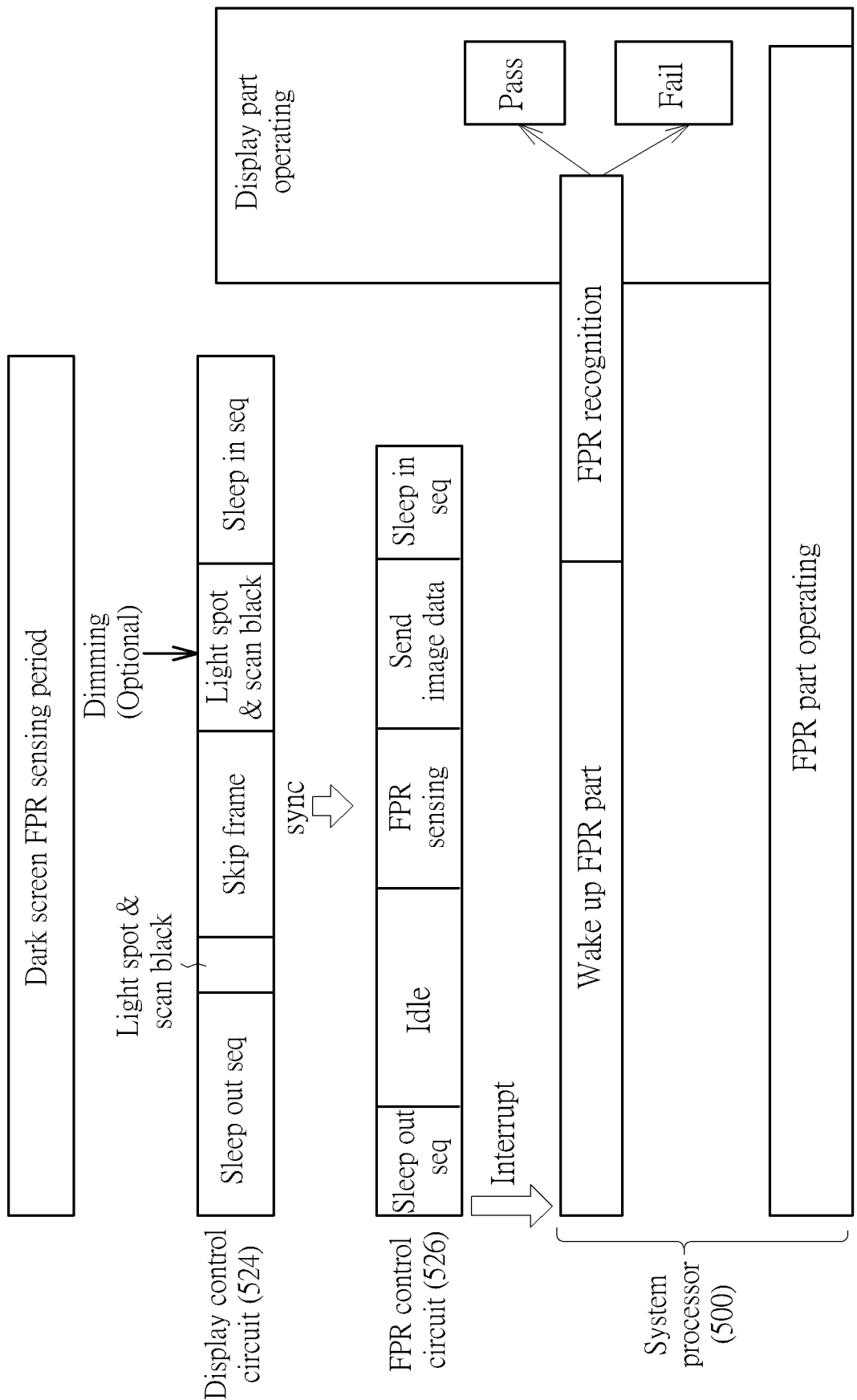
FIG. 9 illustrates the status of the FTDI circuit in the dark screen fingerprint sensing period according to an embodiment of the present invention.

FIG. 9 illustrates the status of the FTDI circuit 502 in the dark screen fingerprint sensing period according to an embodiment of the present invention. In the beginning of the dark screen fingerprint sensing period, both the display control circuit 524 and the fingerprint control circuit 526 of the FTDI circuit 502 may perform the sleep out sequence to exit the sleep mode when the touch control circuit 522 detects a finger touch and recognizes that the finger touch is valid. The display control circuit 524 then performs the display operations of showing light spot(s) and scanning the rest region of the screen to be black through the internal clock during the display periods, and preferably, the light emission of the backlight source 530 may be maximized and a dimming scheme may be applied optionally. The fingerprint control circuit 526 thereby performs fingerprint sensing in the skip frame. In another embodiment, there may be more skip frames in the dark screen fingerprint sensing period and the dimming scheme may be performed flexibly in these display frames. The skip frames may be distributed between the display frames or concentrated at any time in the dark screen fingerprint sensing period. The operations of the fingerprint control circuit 526 may be synchronized with the operations of the display control circuit 524, allowing the fingerprint sensing to be performed during the allocated skip frame in the dark screen fingerprint sensing period. After the fingerprint sensing is completed, the fingerprint control circuit 526 may send the fingerprint image data to the system processor 500.

In some implementations, the fingerprint control circuit 526 of the FTDI circuit 502 can provide an interrupt signal to the system processor 500, to awake the system processor 500 to perform fingerprint recognition and take corresponding measures. For example, the fingerprint control circuit 526 may provide the interrupt signal for waking up the fingerprint part 514 of the system processor 500 after the fingerprint sensing is finished. Alternatively, the fingerprint control circuit 526 may provide the interrupt signal for waking up the fingerprint part 514 of the system processor 500 prior to a finishing time of the fingerprint sensing; hence, the fingerprint part 514 is allowed to start to receive the fingerprint image data from the fingerprint control circuit 526 when the fingerprint sensing is completed. Subsequently, the fingerprint part 514 may start to perform fingerprint recognition on the received fingerprint image data. In an embodiment, the fingerprint control circuit 526 may even provide the interrupt signal for awaking the fingerprint part 514 prior to a starting time of the fingerprint sensing. For example, as shown in FIG. 9, the fingerprint control circuit 526 sends the interrupt signal to awake the fingerprint part 514 when performing the sleep out sequence prior to starting the fingerprint sensing.

It is noted that, in such implementations where the fingerprint control circuit 526 sends the interrupt signal to awake the fingerprint part 514 prior to starting the fingerprint sensing, the fingerprint control circuit 526 may perform the fingerprint sensing based on an instruction from the system processor 500. That is, after the trust zone of the fingerprint part 514 is woken up, the fingerprint part 514 may send a command to the FTDI circuit 502 to instruct the fingerprint control circuit 526 whether to start the fingerprint sensing. In this manner, the system processor 500 is served to determine whether to enable the fingerprint sensing function of the FTDI circuit 502. Therefore, the fingerprint control circuit 526 may start performing the fingerprint sensing through the fingerprint sensor only when it is permitted by the system processor 500. In other words, the FTDI circuit 502 is not allowed to automatically capture fingerprint images without permission of the system processor 500. This improves the security of the display system 50.

Alternatively, in such implementations where the fingerprint control circuit 526 sends the interrupt signal to awake the fingerprint part 514 prior to starting the fingerprint sensing, the fingerprint control circuit 526 can perform the fingerprint sensing after being notified by the touch control circuit 522 without being permitted by the system processor 500.

Please note that the interrupt signal sent when performing the sleep out sequence may only awake the fingerprint part 514 of the system processor 500 such as the trust zone and related recognition module. At this time, the display part 512 of the system processor 500 is not awakened and can be kept in the sleep status, and the associated display interface (e.g., MIPI) is not allowed to transmit any display data. Therefore, the FTDI circuit 502 may control the display panel 504 to display the light spot(s) using internal clock without intervention of the system processor 500.

Please continue referring to FIG. 9. After the fingerprint control circuit 526 completes the fingerprint sensing and sends the fingerprint image data to the system processor 500, the fingerprint control circuit 526 and the display control circuit 524 can perform the sleep in sequence to return to the sleep mode. Subsequently, the display part 512 of the system processor 500 may be woken up to take over the display control of the display panel 504 when the fingerprint recognition is completed, e.g., to show whether the fingerprint recognition passes or fails.

Figure 10:
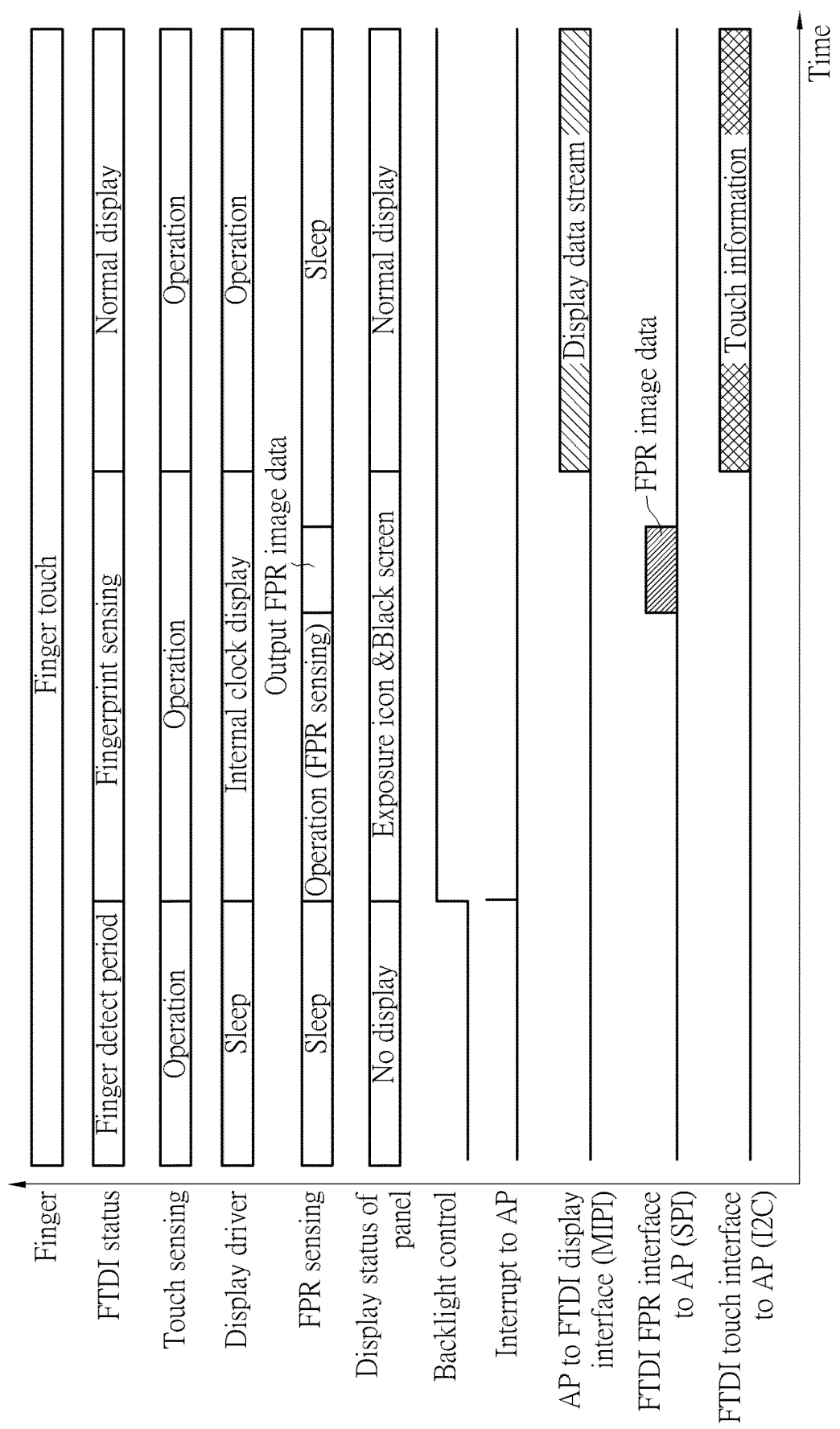
FIG. 10 illustrates another timing diagram of the operations of the display system according to an embodiment of the present invention.

FIG. 10 illustrates another timing diagram of the operations of the display system 50 according to an embodiment of the present invention. The timing diagram is an embodiment alternative to the timing diagram shown in FIG. 7 of U.S. patent application Ser. No. 16/851,043. As shown in FIG. 10, the FTDI circuit 502 can send an interrupt signal to the system processor (AP) 500 to wake up the fingerprint part 514 of the system processor 500 earlier than that in FIG. 7 of U.S. patent application Ser. No. 16/851,043 at the starting time of the fingerprint sensing operation. Other implementations and operations of FIG. 10 are similar to those described in U.S. patent application Ser. No. 16/851,043, and will not be detailed herein.

In an alternative embodiment, the interrupt signal may be sent or provided for the system processor 500 after the fingerprint sensing is finished and the fingerprint image data are ready to be sent to the system processor 500, as similar to the embodiments described in U.S. patent application Ser. No. 16/851,043. In other words, the embodiment of FIG. 7 of U.S. patent application Ser. No. 16/851,043 still can be performed to realize the dark screen fingerprint unlocking process. In such a situation, the interrupt signal may be configured to awake the fingerprint part 514 of the system processor 500 to receive the incoming fingerprint image data. In addition, the display part 512 of the system processor 500 may be awakened to be in an awake status after the fingerprint sensing is completed. For example, this interrupt signal for notify the system processor 500 to start fingerprint recognition based on the fingerprint image data may also be configured to awake or cause the display part 512 of the system processor 500. In this embodiment, the fingerprint control circuit 526 may start to perform the fingerprint sensing through the fingerprint sensor without permission of the system processor 500.

Figure 11:
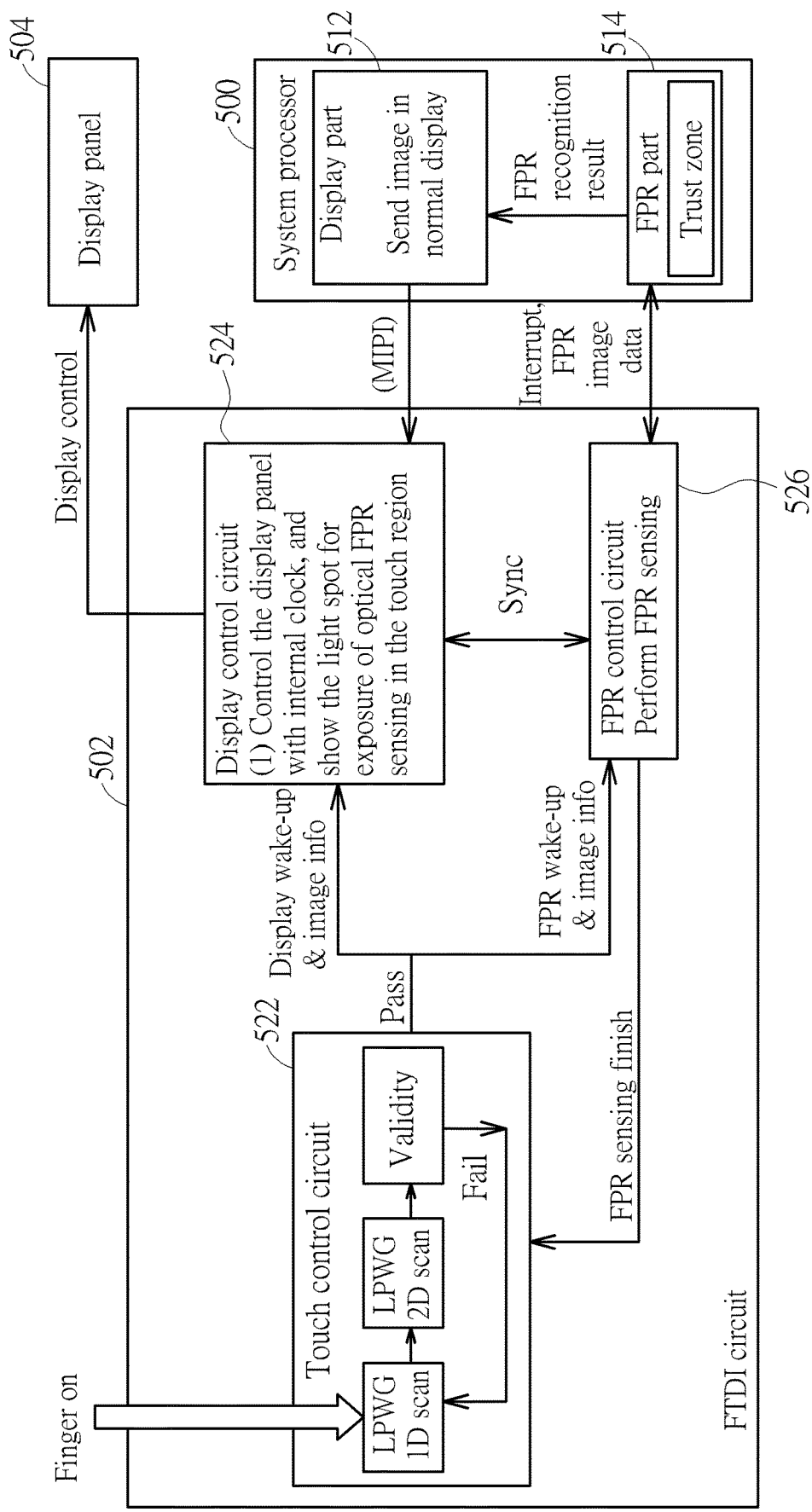
FIG. 11 illustrates the implementations and operations of the FTDI circuit for an OLED panel implemented as the display panel according to an embodiment of the present invention.

Please note that the above embodiments illustrate the implementations of the dark screen fingerprint unlocking operation for an LCD panel. However, the disclosure can be applied to various types of display panels. For example, in another embodiment, the dark screen fingerprint unlocking operation may also be applicable to another type of display panel such as an organic light-emitting diode (OLED) panel. As for the self-luminous feature of the OLED panel, no backlight source is required; hence, the display control circuit 524 of the FTDI circuit 502 does not need to output any control signal for controlling the backlight source. FIG. 11 illustrates the implementations and operations of the FTDI circuit 502 for an OLED panel implemented as the display panel 504 according to an embodiment of the present invention. As shown in FIG. 11, the FTDI circuit 502 may not send signals for controlling a backlight module since there is no backlight module included in the display panel 504. In addition, the FTDI circuit 502 may send a brightness control signal (not shown) to the display panel 504 for controlling brightness of the display panel 504. The rest operations regarding FIG. 11 are similar to the operations regarding FIG. 5 as described above, and will not be repeated herein.

The following describes various embodiments of the present invention with timing diagrams.

Figure 12:
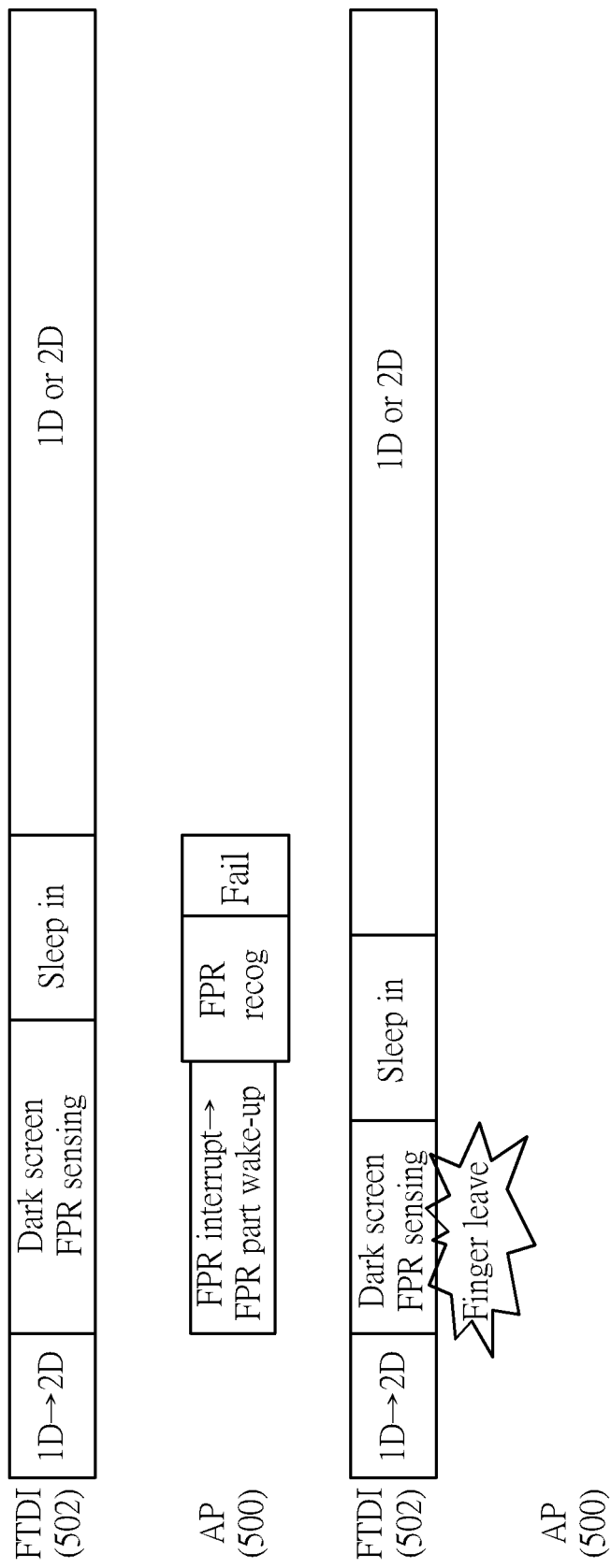
FIG. 12 is a timing diagram of a dark screen fingerprint unlocking period according to an embodiment of the present invention.

Please refer to FIG. 12, which is a timing diagram of a dark screen fingerprint unlocking period according to an embodiment of the present invention. FIG. 12 illustrates failed fingerprint unlocking due to several reasons, where the operations of the FTDI circuit 502 and the system processor (AP) 500 are shown. First, in the FTDI circuit 502, the touch control circuit 522 performs 1D touch scan for detecting the existence of a finger touch, while the display control circuit 524 and the fingerprint control circuit 526 are in the sleep mode. When a touch on the display panel 504 is detected, the touch control circuit 522 starts the 2D touch scan for detecting more information of the finger touch such as the position information of the finger touch. The 1D and 2D touch scan can be performed in the LPWG mode. In some implementations, a wakeup gesture may also be detected under the lower power sleep mode to determine whether the touch is valid to start the fingerprint sensing. If the touch control circuit 522 determines that the finger touch is valid, it may wake up the display control circuit 524 and the fingerprint control circuit 526, to start the dark screen fingerprint sensing. In different implementations, at the beginning or ending of the dark screen fingerprint sensing period, the fingerprint control circuit 526 may send an interrupt signal to the system processor 500, to awake the fingerprint part 514 of the system processor 500. Subsequently, the fingerprint image data generated through the dark screen fingerprint sensing is sent to the system processor 500, and the system processor 500 performs fingerprint recognition on the received fingerprint image data.

In this embodiment, the fingerprint recognition of the system processor 500 may indicate a failure result; in some implementations, the system processor 500 cannot enable its display part 512, so that the display part 512 remains in the sleep status. In such a situation, the display function remains off, and the display panel 504 does not display the failure result or any other image. The display part 512 of the system processor 500 can remain in the sleep status. At the same time, the display control circuit 524 and the fingerprint control circuit 526 of the FTDI circuit 502 return to the sleep mode, and the touch control circuit 522 can return to the 1D or 2D scan mode and restarts to perform low power touch detection on the display panel 504.

As mentioned above, the touch control circuit 522 may continue to periodically monitor and determine whether the finger touch stays on the touch screen of the display panel 504 during the dark screen fingerprint sensing. In an embodiment, when the touch control circuit 522 detects that the finger leaves the display panel 504, it may control the display control circuit 524 and the fingerprint control circuit 526 to return to the sleep mode. In such a situation, the display function also remains off, and the display panel 504 does not display any image.

Figure 13:
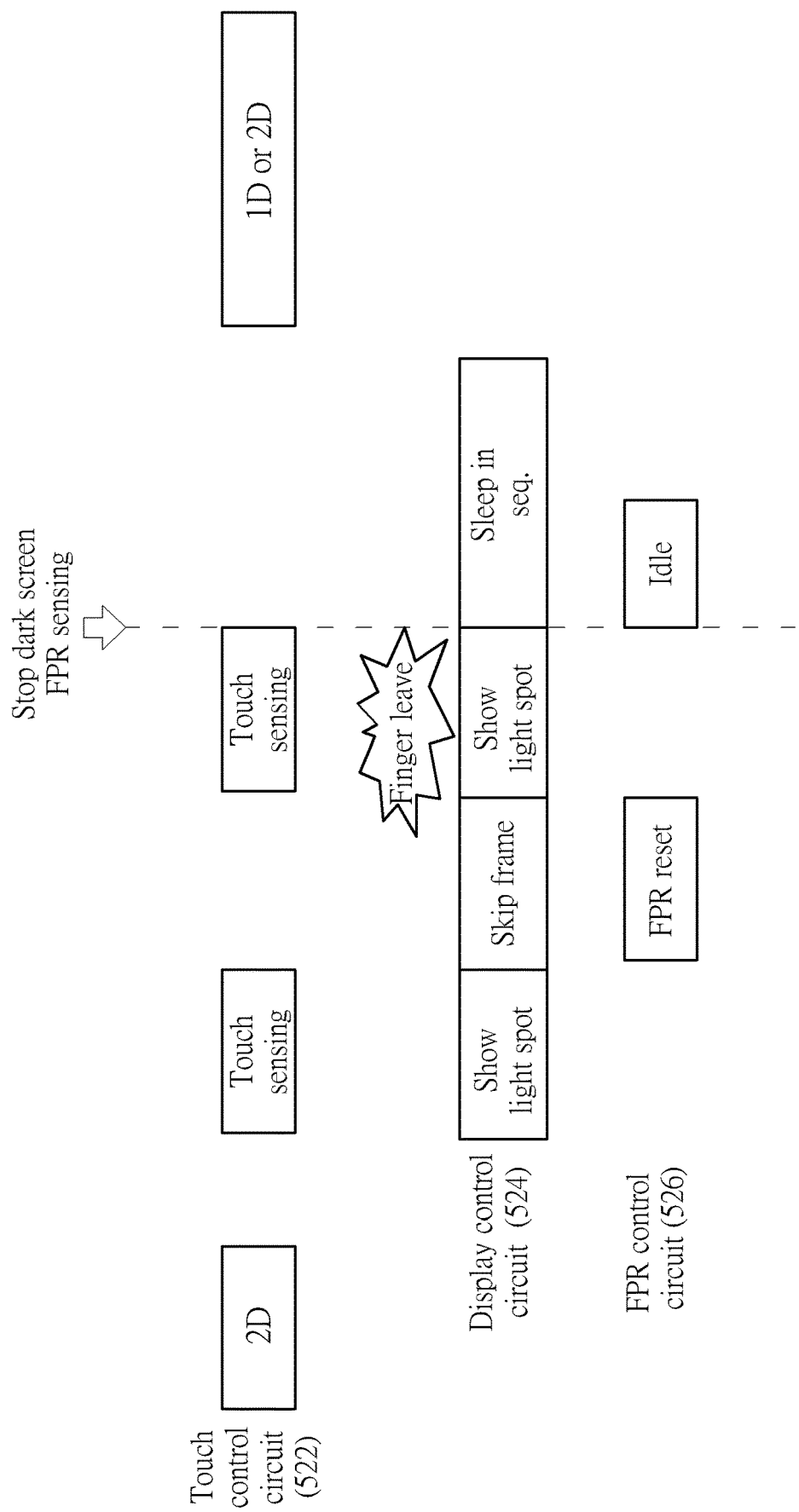
FIG. 13 illustrates a situation that a finger touch leaves the display panel during fingerprint sensing in more detail according to an embodiment of the present invention.

FIG. 13 illustrates a situation that a finger touch leaves the display panel 504 during fingerprint sensing in more detail according to an embodiment of the present invention. As shown in FIG. 13, the display control circuit 524 may control the display panel 504 to show the light spot for exposure, and the fingerprint control circuit 526 may perform fingerprint sensing (including resetting and selecting/writing) in a skip frame. The touch control circuit 522 may periodically perform touch sensing when the display panel 504 shows the light spot. When the touch control circuit 522 detects that the finger leaves the touch screen of the display panel 504, the fingerprint control circuit 526 may stop performing the dark screen fingerprint sensing and return to the sleep mode or idle mode. Meanwhile, the display control circuit 524 may also stop showing the light spot and perform the sleep in sequence to enter the sleep mode or idle mode. The touch control circuit 522 also enters the 1D (or 2D) scan mode. As a result, the FTDI circuit 502 cannot perform unnecessary fingerprint sensing and the system processor 500 will not perform unnecessary fingerprint recognition after the finger is removed from the touch screen.

Figure 14:
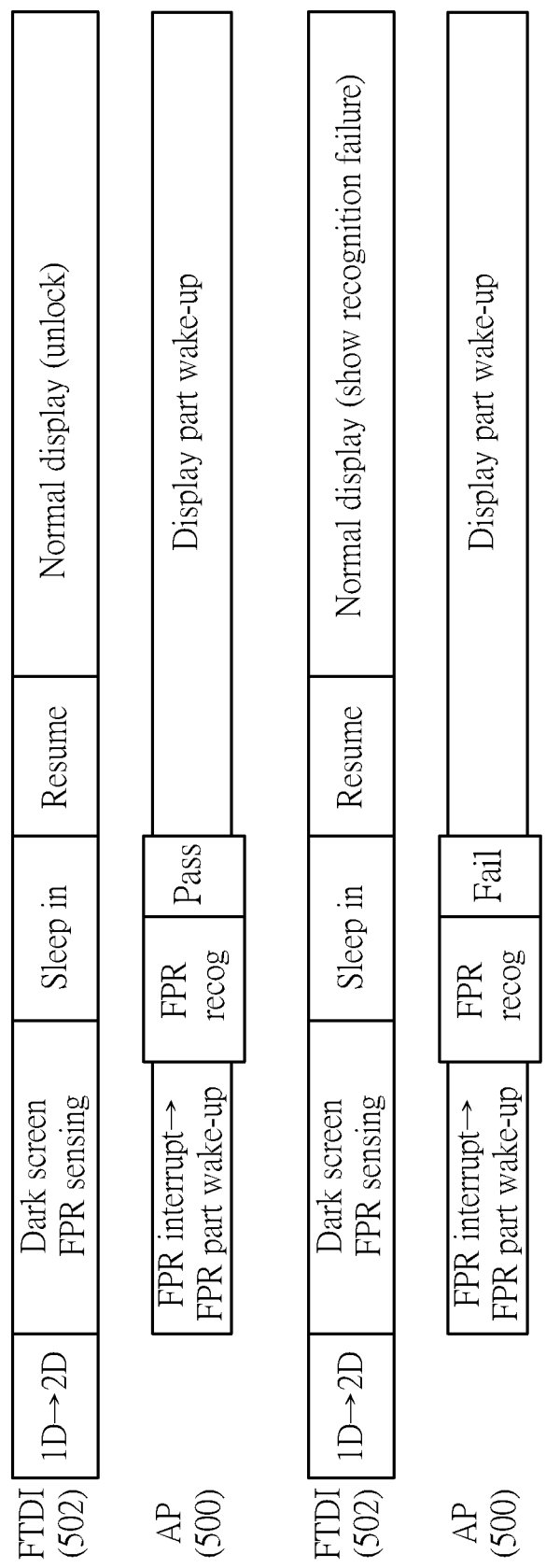
FIGS. 14-18 are timing diagrams of a dark screen fingerprint unlocking period according to embodiments of the present invention.

Please refer to FIG. 14, which is a timing diagram of a dark screen fingerprint unlocking period according to an embodiment of the present invention. FIG. 14 illustrates that the display panel 504 shows the fingerprint recognition result after the fingerprint recognition is completed. As shown in FIG. 14, no matter whether the fingerprint recognition passes or fails, the system processor 500 may wake up the display part 512 to start the normal display operation, to perform normal display on the display panel 504.

In this embodiment, after the system processor 500 completes the fingerprint recognition based on the fingerprint image data received from the FTDI circuit 502, the display part 512 may be woken up to enter an awake status, and thereby controls the display control circuit 524 and the display panel 504 to display the fingerprint recognition result. In detail, if the fingerprint recognition is failed, the display panel 504 may show a message of recognition failure; and if the fingerprint recognition is successful, the display panel 504 may be successfully unlocked (e.g., show the homepage). After the FTDI circuit 502 completes the fingerprint sensing, it may perform the sleep in sequence to return to the sleep mode or idle mode. Subsequently, when the display part 512 of the system processor 500 is changed to the awake status, it may instruct the FTDI circuit 502 to perform a display resume sequence, so as to enable the normal display function. In this embodiment, the display resume sequence may be started after the FTDI circuit 502 is notified by the system processor 500. The FTDI circuit 502 may thereby display the corresponding fingerprint recognition result on the display panel 504.

Figure 15:
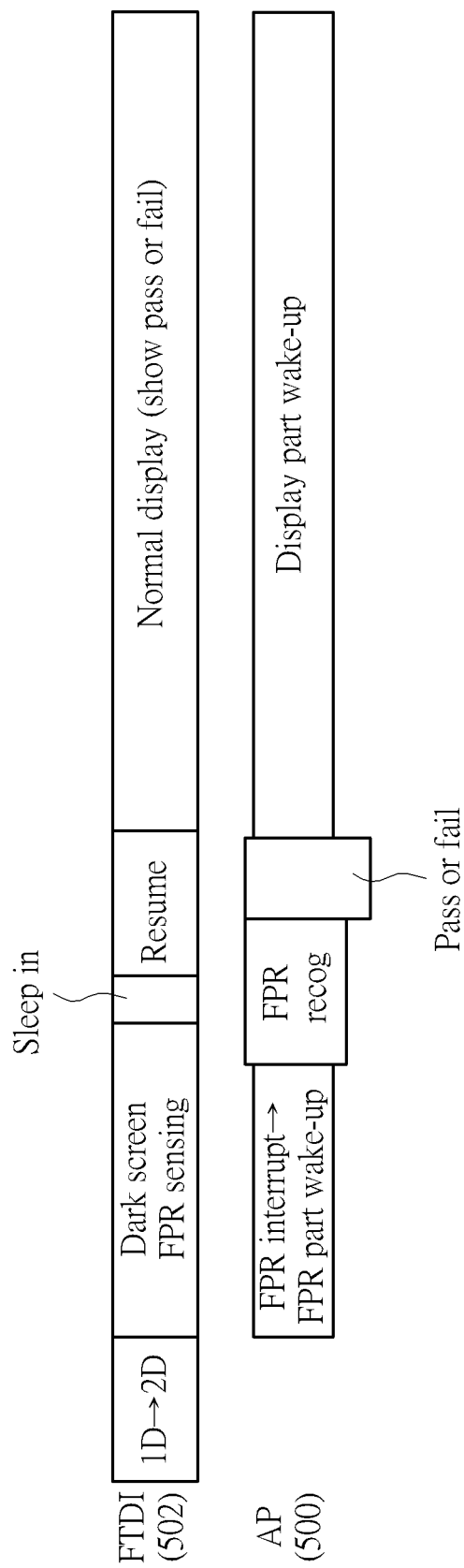

Please refer to FIG. 15, which is a timing diagram of a dark screen fingerprint unlocking period according to an embodiment of the present invention. In order to shorten the time consumption of the dark screen fingerprint sensing, the display resume sequence may be started before the fingerprint recognition result (pass or fail) is generated by the system processor 500, as shown in FIG. 15. Preferably, the system processor 500 may be controlled to complete the fingerprint recognition at the same time when the display resume is completed, so that the system processor 500 may control the display control circuit 524 to output the display image indicating the fingerprint recognition result right after the system processor 500 completes the fingerprint recognition and generates the recognition result. In addition, in some implementations, the FTDI circuit 502 may predict the time required for performing the display resume sequence and the time required by the system processor 500 to complete the fingerprint recognition, and thereby start the display resume sequence earlier, i.e., by a predetermined time ahead of receiving the fingerprint recognition result. As a result, the display resume sequence may be completed at the time when the fingerprint recognition result is received by the FTDI circuit 502.

In this embodiment, the FTDI circuit 502 performs the display resume sequence while the system processor 500 is calculating the fingerprint image data and performing matching for fingerprint recognition, and the display resume sequence is completed when the system processor 500 generates the fingerprint recognition result and sends it to the FTDI circuit 502. The simultaneous operations of the FTDI circuit 502 and the system processor 500 may further save the time consumption for the dark screen fingerprint unlocking operations.

Figure 16:
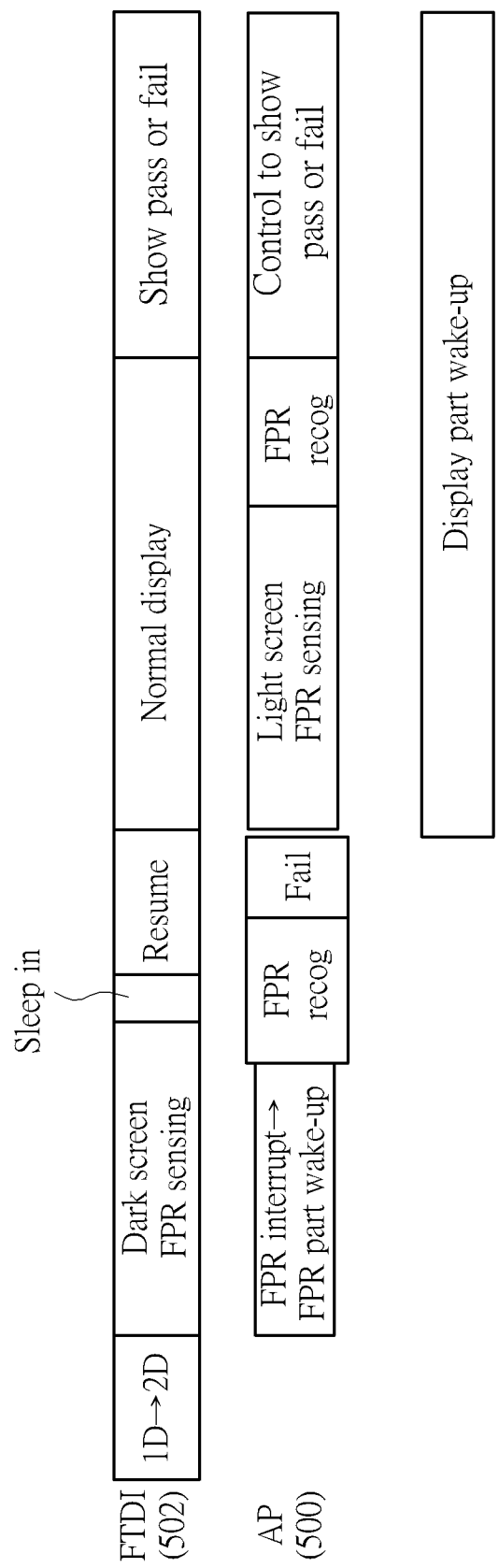

Please refer to FIG. 16, which is a timing diagram of a dark screen fingerprint unlocking period according to an embodiment of the present invention. FIG. 16 illustrates a case where the fingerprint recognition based on the fingerprint image data of the dark screen fingerprint sensing indicates a failure result. In this embodiment, after the dark screen fingerprint sensing operation, the display part 512 of the system processor 500 may be awaken (i.e., in an awake status), which controls the FTDI circuit 502 to start the display resume sequence, in order to enable the normal display operation, as similar to the case shown in FIG. 15. Subsequently, after the fingerprint recognition is determined to be failed, the fingerprint control circuit 526 of the FTDI circuit 502 may further restart to perform fingerprint sensing when the display part 512 is under the awaken status (i.e., the light screen fingerprint sensing). In such a situation, the display part 512 may control the display operation to show the light spot and scan black on the display panel 504. The fingerprint control circuit 526 performs fingerprint sensing again and sends the fingerprint image data to the system processor 500. The fingerprint part 514 of the system processor 500 may receive an interrupt signal and correspondingly receive fingerprint image data from the fingerprint control circuit 526, and perform fingerprint recognition to determine the recognition result. The display panel 504 then shows the fingerprint recognition result (pass or fail).

Figure 17:
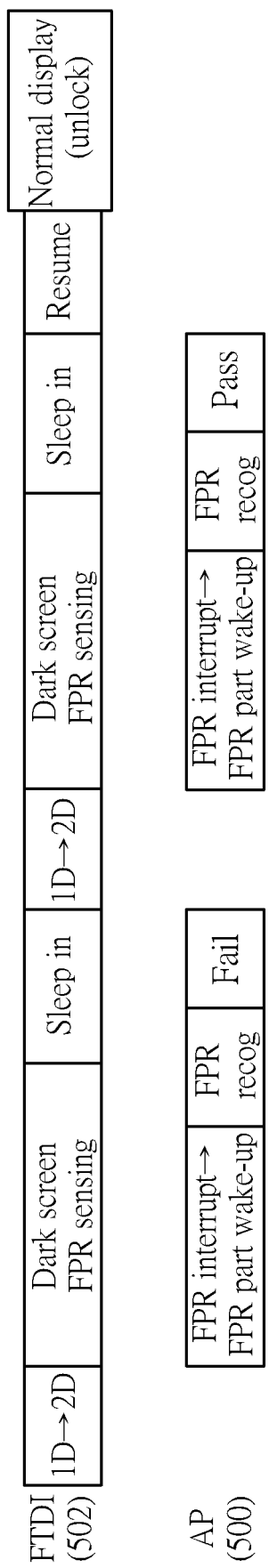

Please refer to FIG. 17, which is a timing diagram of a dark screen fingerprint unlocking period according to an embodiment of the present invention. As shown in FIG. 17, after the first dark screen fingerprint sensing is completed and the fingerprint recognition indicates a failure result, the FTDI circuit 502 returns to the sleep mode, and the touch control circuit 522 restarts the 1D touch scan to detect whether there is a touch on the screen of the display panel 504. In this embodiment, the touch control circuit 522 may detect that the finger is still put on the screen, and thereby enter the 2D scan mode to detect the touched position of the finger touch on the display panel 504. If the finger touch is determined to be valid, the FTDI circuit 502 may restart the dark screen fingerprint sensing. If the fingerprint recognition is successful, the system processor 500 may instruct the FTDI circuit 502 to start the display resume sequence; hence, the display panel 504 may enable the normal display operation, e.g., to show the homepage after unlocking. In this embodiment, the system processor 500 may not enable the normal display operation before successful fingerprint recognition. Alternatively or additionally, after a predefined number of recognition failures, the normal display operation of the display panel 504 may still be enabled, to show a user interface that allows the user to key in a password to unlock the screen.

As for a general display system, when it is powered on, the display resume sequence is performed to reset the system to start the display operation. Therefore, in the above embodiments of FIGS. 12-17, after the FTDI circuit 502 completes the dark screen fingerprint sensing operation, it performs a sleep in sequence to return to the sleep mode (e.g., pulling the operating voltages back to the ground). Then the display resume sequence may start (e.g., for boosting the operating voltages to appropriate levels) before normal display operation. The sleep in sequence together with the display resume sequence causes a lot of wasted time. In contrast, as will be shown in an embodiment as shown in FIG. 18, there is no need to perform the sleep in sequence and display resume sequence, which may achieve time saving for at least hundreds of milliseconds.

Figure 18:
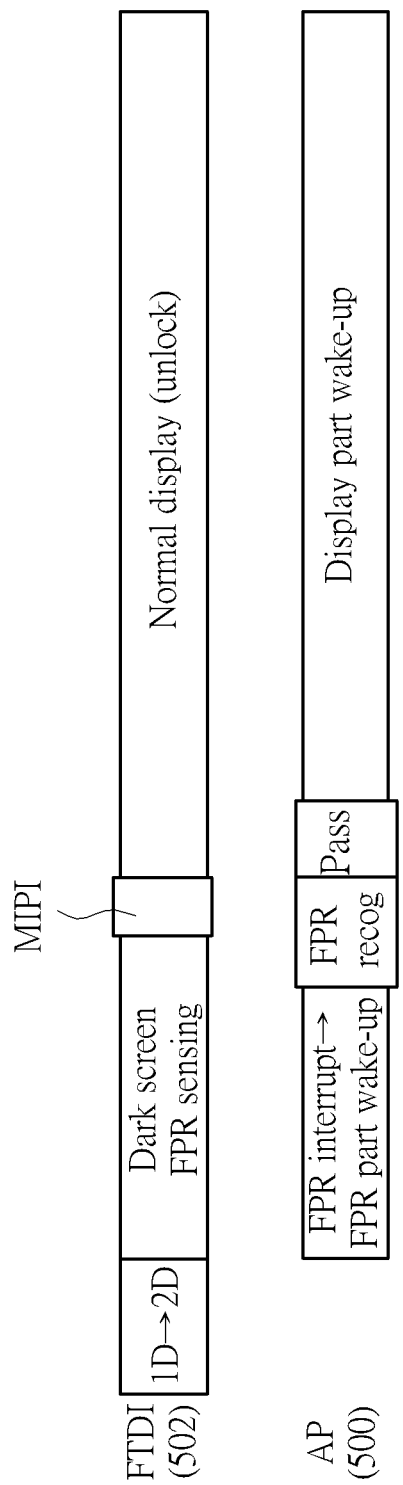

Please refer to FIG. 18, which is a timing diagram of a dark screen fingerprint unlocking period according to an embodiment of the present invention. As shown in FIG. 18, after the dark screen fingerprint sensing is completed, the FTDI circuit 502 does not perform the sleep in sequence to enter the sleep mode. Therefore, no display resume sequence is required. In this embodiment, the display part 512 of the system processor 500 may be woken up after fingerprint recognition is successful, and then the display part 512 may control the display control circuit 524 of the FTDI circuit 502 to display the fingerprint recognition result without performing any display resume sequence. Since the FTDI circuit 502 is in the sleep out status during the dark screen fingerprint sensing period, its operating voltages (such as the gate voltages VGH/VGL) may be the same as the operating voltages in the light screen display mode (i.e., the display operation performed by receiving image data from the system processor 500); hence, the internal clock display of the FTDI circuit 502 may seamlessly transit to the external clock display handled by the system processor 500. In the external clock display, the system processor 500 may send image data to the display control circuit 524 of the FTDI circuit 502 through for example the MIPI, allowing the image data to be displayed on the display panel 504.

As mentioned above, the FTDI circuit 502 should be controlled to start the display resume sequence after the fingerprint recognition of the system processor 500 is completed and the corresponding recognition result is obtained. The display resume sequence should be performed after the FTDI circuit 502 completes the dark screen fingerprint sensing process and returns to the sleep mode. To achieve this purpose, the FTDI circuit 502 may send an indication signal to the system processor 500, to indicate whether the FTDI circuit 502 is in the sleep mode or the activated mode.

Figure 19:
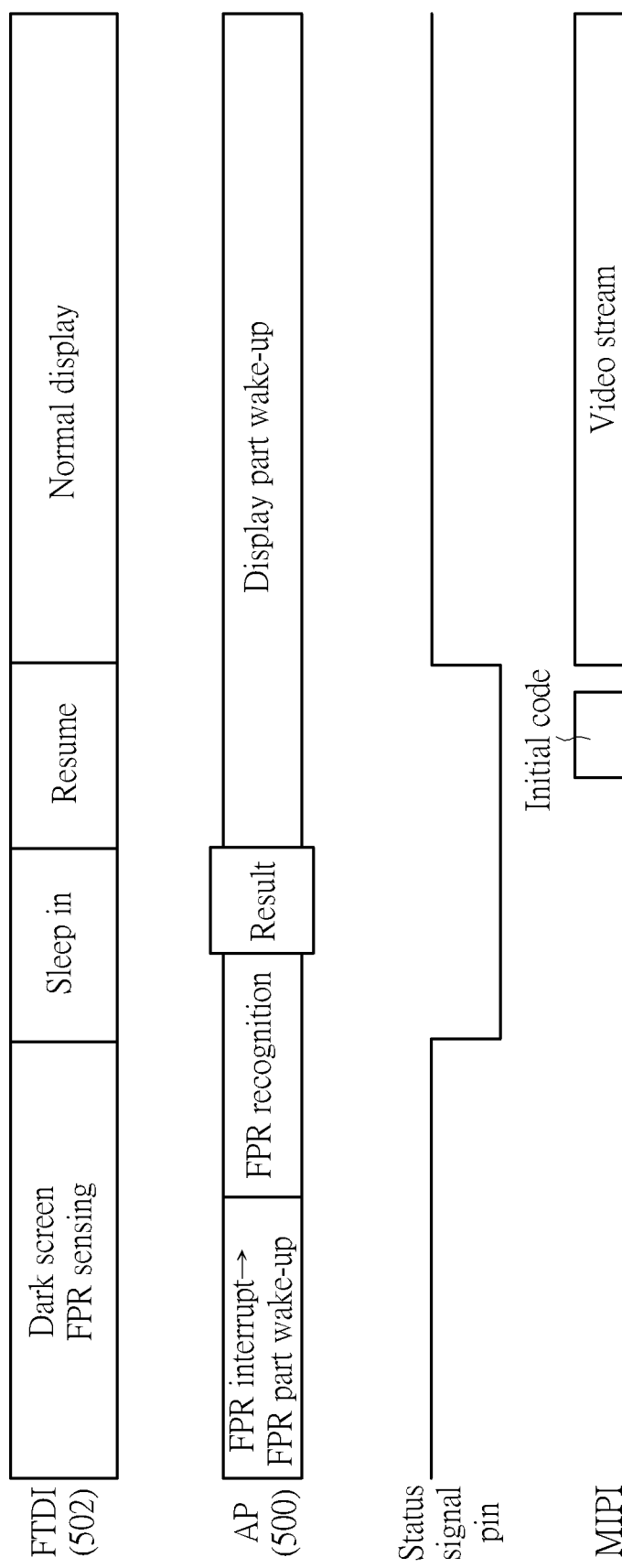
FIG. 19 is a schematic diagram of the status of the FTDI circuit during the dark screen fingerprint unlocking period according to an embodiment of the present invention.

Please refer to FIG. 19, which is a schematic diagram of the status of the FTDI circuit 502 during the dark screen fingerprint unlocking period according to an embodiment of the present invention. As shown in FIG. 19, the FTDI circuit 502 may start the dark screen fingerprint sensing operation when a valid finger touch is detected. Meanwhile, the FTDI circuit 502 may send an interrupt signal to wake up the fingerprint part 514 of the system processor 500. The fingerprint part 514 then starts the fingerprint recognition after the fingerprint sensing is completed and the fingerprint image data is received from the FTDI circuit 502. Afterwards, the FTDI circuit 502 performs the sleep in sequence to enter the sleep mode, and then perform the display resume sequence when receiving the fingerprint recognition result from the system processor 500. The system processor 500 thereby wakes up the display part 512 to enable the normal display operation, where the system processor 500 sends the video stream through the MIPI interface between the display part 512 of the system processor 500 and the display control circuit 524 of the FTDI circuit 502.

In order to perform the handshake between the system processor 500 and the FTDI circuit 502, a status signal pin may be disposed therebetween. In detail, the status signal pin may be pulled to a specific state (such as high) when the FTDI circuit 502 is activated to perform the dark screen fingerprint sensing or to start the normal display, and the status signal pin may be pulled to another state (such as low) after the dark screen fingerprint sensing process is completed and both the display control circuit 524 and the fingerprint control circuit 526 enter the sleep mode. Before the system processor 500 controls the FTDI circuit 502 to start the display resume sequence for the normal display operation, the system processor 500 should determine that the status signal pin is in the low state. This ensures the FTDI circuit 502 to be operated normally and safely.

Figure 20:
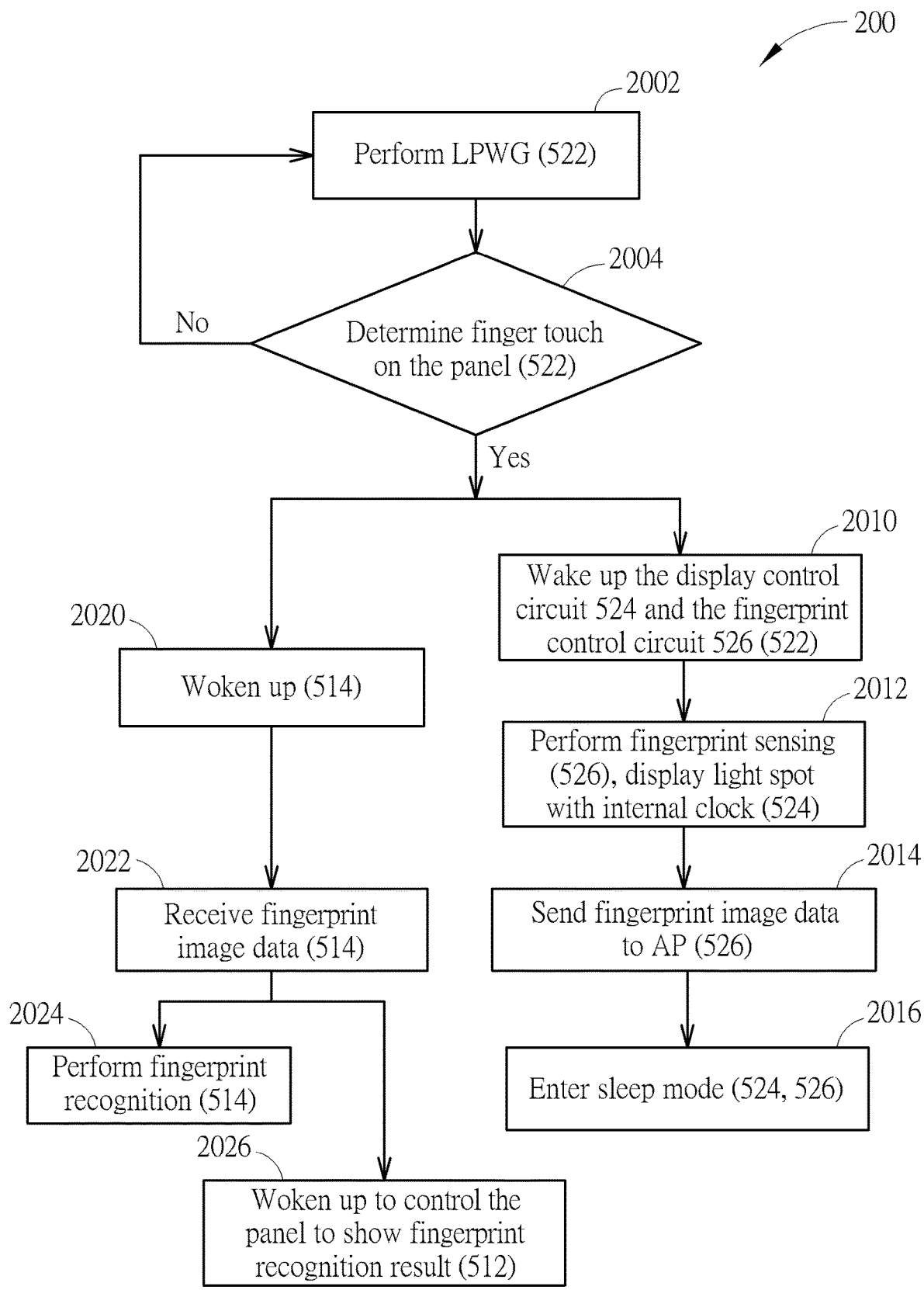
FIGS. 20-23 are flowcharts of the dark screen fingerprint unlocking process according to embodiments of the present invention.

The abovementioned operations of the dark screen fingerprint unlocking may be summarized into a dark screen fingerprint unlocking process 200, as shown in FIG. 20 according to an embodiment of the present invention. The dark screen fingerprint unlocking process 200, which may be implemented in a display system such as the display system 50 shown in FIG. 5, includes the following steps:

Step 2002: The touch control circuit 522 performs the LPWG operation.

Step 2004: The touch control circuit 522 determines whether there is a finger touch on the display panel 504. If yes, go to Step 2010 for the FTDI circuit's 502 operations and go to Step 2020 for the system processor's 500 operations; otherwise, go to Step 2002.

Step 2010: The touch control circuit 522 wakes up the display control circuit 524 and the fingerprint control circuit 526.

Step 2012: The fingerprint control circuit 526 performs fingerprint sensing, and the display control circuit 524 displays the light spot with internal clock.

Step 2014: The fingerprint control circuit 526 sends the fingerprint image data to the system processor 500.

Step 2016: The display control circuit 524 and the fingerprint control circuit 526 enter the sleep mode.

Step 2020: The fingerprint part 514 of the system processor 500 is woken up.

Step 2022: The fingerprint part 514 receives the fingerprint image data.

Step 2024: The fingerprint part 514 performs fingerprint recognition.

Step 2026: The display part 512 of the system processor 500 is woken up to control the display panel 504 to show the fingerprint recognition result.

Figure 21:
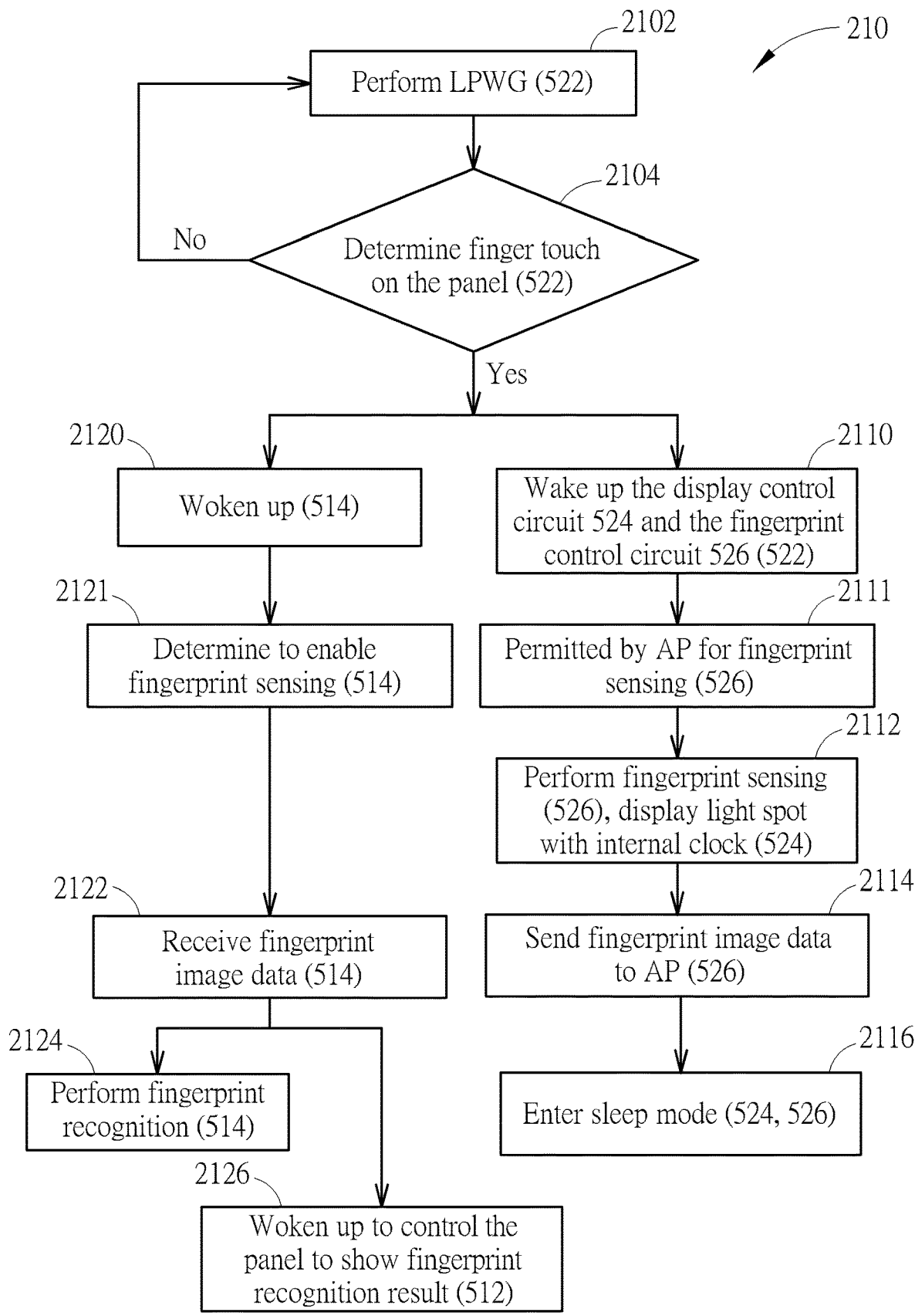

In another embodiment, the fingerprint control circuit 526 of the FTDI circuit 502 may start to perform fingerprint sensing when permitted by the system processor 500, in order to improve the security of the display system 50. In such a situation, the dark screen fingerprint unlocking process may be modified to be as the flowchart shown in FIG. 21. FIG. 21 illustrates another dark screen fingerprint unlocking process 210 according to an embodiment of the present invention, which includes the following steps:

Step 2102: The touch control circuit 522 performs the LPWG operation.

Step 2104: The touch control circuit 522 determines whether there is a finger touch on the display panel 504. If yes, go to Step 2110 for the FTDI circuit's 502 operations and go to Step 2120 for the system processor's 500 operations; otherwise, go to Step 2102.

Step 2110: The touch control circuit 522 wakes up the display control circuit 524 and the fingerprint control circuit 526.

Step 2111: The fingerprint control circuit 526 is permitted by the system processor 500 for fingerprint sensing.

Step 2112: The fingerprint control circuit 526 performs fingerprint sensing, and the display control circuit 524 displays the light spot with internal clock.

Step 2114: The fingerprint control circuit 526 sends the fingerprint image data to the system processor 500.

Step 2116: The display control circuit 524 and the fingerprint control circuit 526 enter the sleep mode.

Step 2120: The fingerprint part 514 of the system processor 500 is woken up.

Step 2121: The fingerprint part 514 determines to enable fingerprint sensing.

Step 2122: The fingerprint part 514 receives the fingerprint image data.

Step 2124: The fingerprint part 514 performs fingerprint recognition.

Step 2126: The display part 512 of the system processor 500 is woken up to control the display panel 504 to show the fingerprint recognition result.

The detailed operations and alternations of the dark screen fingerprint unlocking processes 200 and 210 are illustrated in the above paragraphs, and will not be narrated herein.

Figure 22:
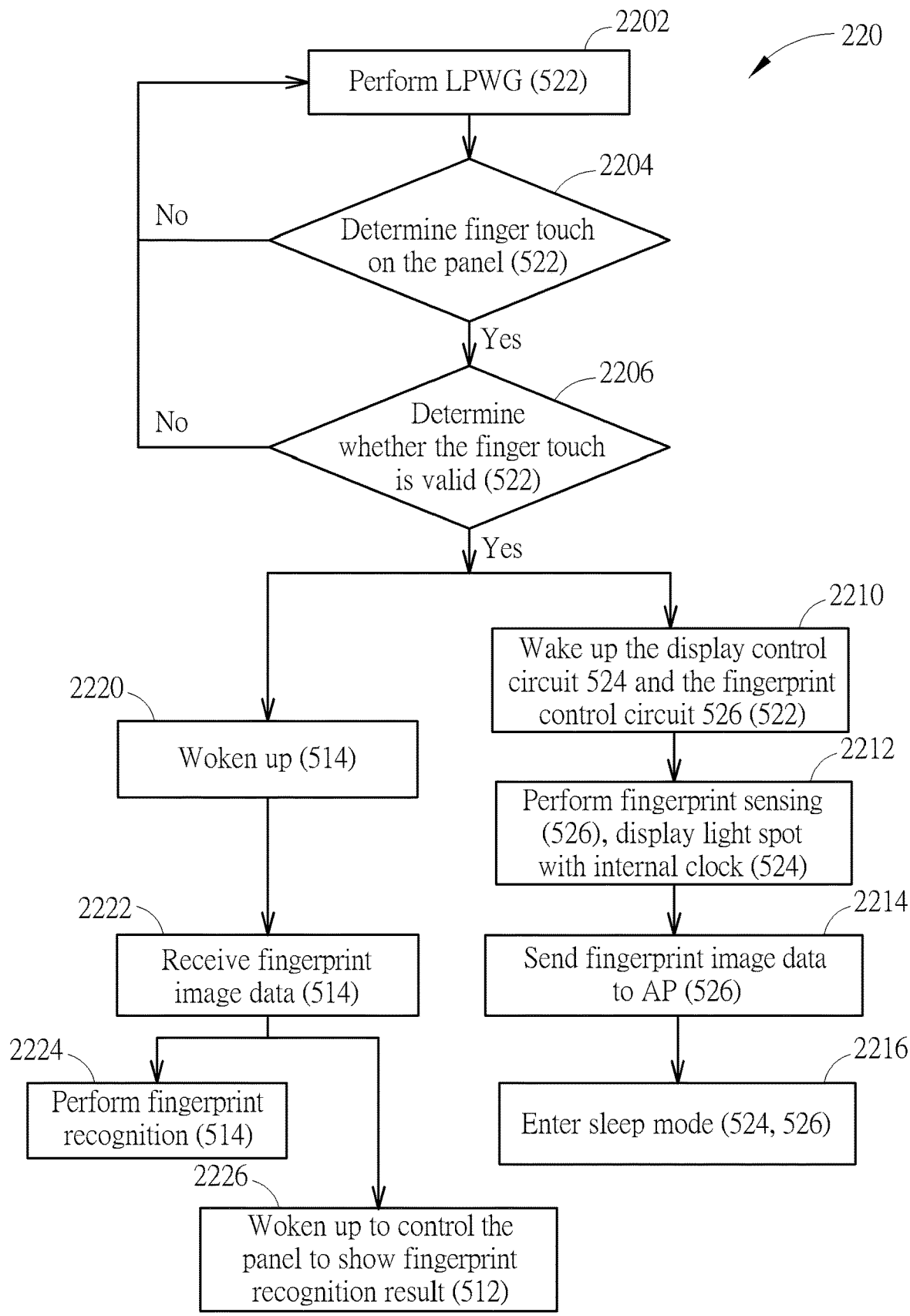

In a further embodiment, the touch control circuit 522 may determine the validity of the finger touch based on the touch sensing area, the touch signal strength and/or the predetermined touch gesture. In such a situation, the dark screen fingerprint unlocking process may be modified to be as the flowchart shown in FIG. 22. FIG. 22 illustrates a further dark screen fingerprint unlocking process 220 according to an embodiment of the present invention, which includes the following steps:

Step 2202: The touch control circuit 522 performs the LPWG operation.

Step 2204: The touch control circuit 522 determines whether there is a finger touch on the display panel 504. If yes, go to Step 2206; otherwise, go to Step 2202.

Step 2206: The touch control circuit 522 determines whether the finger touch is valid. If yes, go to Step 2210 for the FTDI circuit's 502 operations and go to Step 2220 for the system processor's 500 operations; otherwise, go to Step 2202.

Step 2210: The touch control circuit 522 wakes up the display control circuit 524 and the fingerprint control circuit 526.

Step 2212: The fingerprint control circuit 526 performs fingerprint sensing, and the display control circuit 524 displays the light spot with internal clock.

Step 2214: The fingerprint control circuit 526 sends the fingerprint image data to the system processor 500.

Step 2216: The display control circuit 524 and the fingerprint control circuit 526 enter the sleep mode.

Step 2220: The fingerprint part 514 of the system processor 500 is woken up.

Step 2222: The fingerprint part 514 receives the fingerprint image data.

Step 2224: The fingerprint part 514 performs fingerprint recognition.

Step 2226: The display part 512 of the system processor 500 is woken up to control the display panel 504 to show the fingerprint recognition result.

Figure 23:
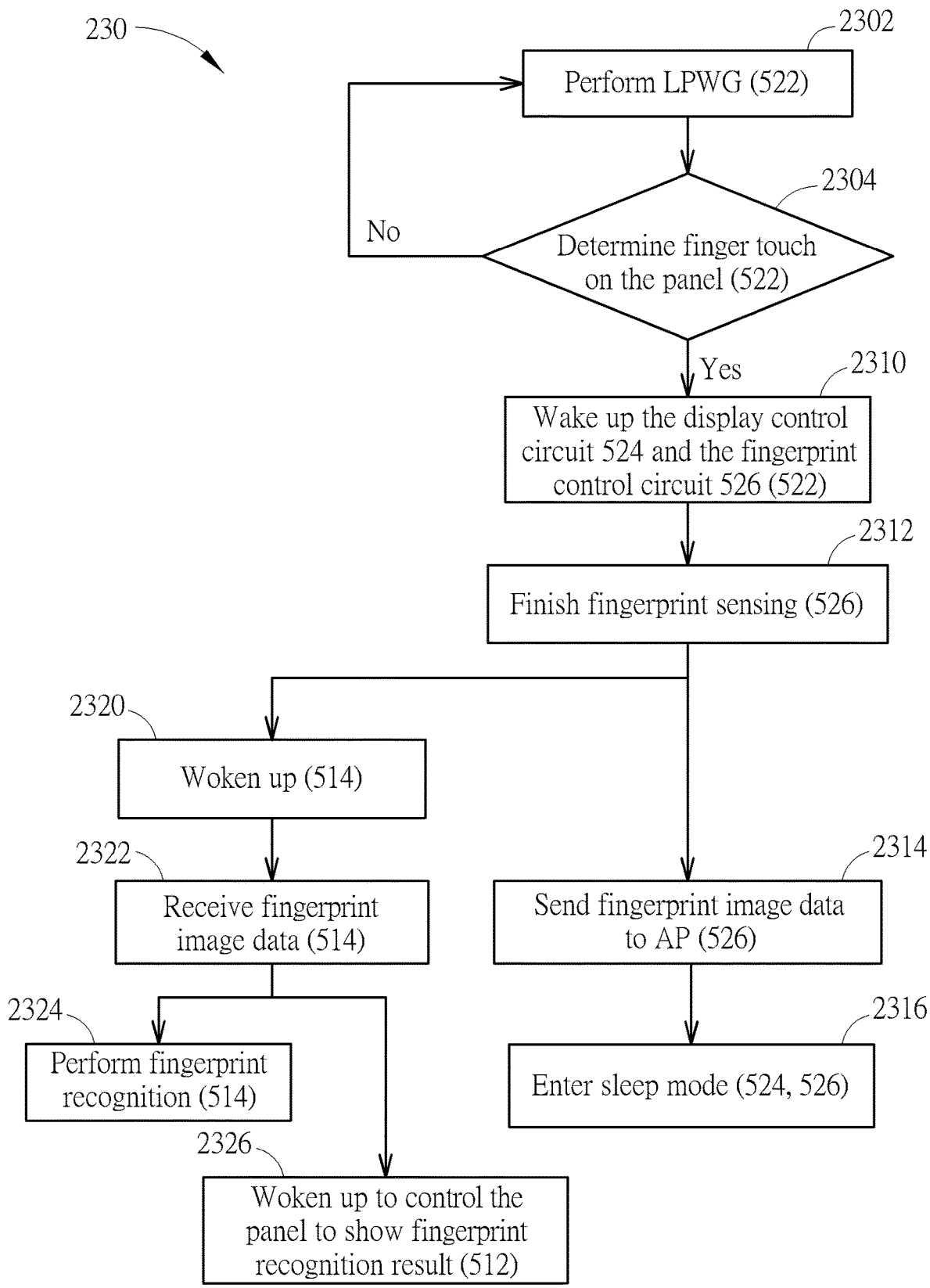

In the above embodiments, the fingerprint part 514 of the system processor 500 is woken up when the fingerprint control circuit 526 starts the fingerprint sensing. In an alternative embodiment, both the display part 512 and the fingerprint part 514 of the system processor 500 may be woken up after the fingerprint sensing is finished and then the FTDI circuit 502 intends to send the fingerprint image data to the system processor 500. In such a situation, the dark screen fingerprint unlocking process may be modified to be as the flowchart shown in FIG. 23. FIG. 23 illustrates another dark screen fingerprint unlocking process 230 according to an embodiment of the present invention, which includes the following steps:

Step 2302: The touch control circuit 522 performs the LPWG operation.

Step 2304: The touch control circuit 522 determines whether there is a finger touch on the display panel 504. If yes, go to Step 2310; otherwise, go to Step 2302.

Step 2310: The touch control circuit 522 wakes up the display control circuit 524 and the fingerprint control circuit 526.

Step 2312: The fingerprint control circuit 526 finishes fingerprint sensing.

Step 2314: The fingerprint control circuit 526 sends the fingerprint image data to the system processor 500.

Step 2316: The display control circuit 524 and the fingerprint control circuit 526 enter the sleep mode.

Step 2320: The fingerprint part 514 of the system processor 500 is woken up.

Step 2322: The fingerprint part 514 receives the fingerprint image data.

Step 2324: The fingerprint part 514 performs fingerprint recognition.

Step 2326: The display part 512 of the system processor 500 is woken up to control the display panel 504 to show the fingerprint recognition result.

The detailed operations and alternations of the dark screen fingerprint unlocking processes 220 and 230 are illustrated in the above paragraphs, and will not be narrated herein.

It is noted that in alternative embodiments, it may not be required that a display part of a system processor be always/continuously kept in a sleep status when the detection of a finger touch, displaying at least one light spot, fingerprint sensing and sending fingerprint image data to the system processor are performed. In some embodiments, at least displaying at least one light spot may be performed without intervention of a display part of the system processor, which may be in the sleep status to save power. In another example, at least one of the detection of a finger touch and displaying at least one light spot can be performed by keeping the display part of the system processor in the sleep status. This means that not all of the above four steps are required to be performed by keeping the display part of the system process in the sleep status. In some embodiments, at least one of the detection of a finger touch and displaying at least one light spot are performed under a condition where the display panel (i.e., the screen) is dark except displaying the light spot. The control circuit can therefore be responsible for displaying the light spot without intervention of a display part of the system processor. This also means that any approaches capable of saving power or reducing intervention of the system processor and/or the display panel can be utilized.

To sum up, the embodiments of the present invention may provide a control circuit (e.g., FTDI circuit) capable of performing dark screen fingerprint unlocking to unlock the display panel based on fingerprint recognition. A display part of the system processor therefore may be kept in a sleep status during the dark screen fingerprint unlocking process. The control circuit may perform the dark screen fingerprint sensing, where the display control circuit controls the display panel to show the light spot through an internal clock of the control circuit without intervention of the system processor, and the fingerprint control circuit performs optical fingerprint sensing using the light spot displayed by a display control circuit of the FTDI circuit. The touch control circuit may be configured to perform the LPWG operation to determine whether there is a valid finger touch on the display panel, and thereby provide the information (e.g., position information) of the finger touch for the display control circuit and the fingerprint control circuit. The control circuit may wake up a fingerprint part of the system processor before the fingerprint sensing process is started or after fingerprint sensing process is completed in different implementations. The fingerprint control circuit may start performing fingerprint sensing operation with or without permission of the system processor in different embodiments. Subsequently, the control circuit may output the fingerprint image data to the system processor after completing the fingerprint sensing, and the fingerprint part of the system processor may perform fingerprint recognition on the received fingerprint image data. In addition, the system processor may control the control circuit to perform a display resume sequence, to start the normal display operation (where the image data is received from the system processor). The display resume sequence can be started at desired time points or even removed in different implementations. When the recognition is failed, a normal display function to light up the screen may then show the recognition result so as to perform a light screen fingerprint unlocking process. Alternatively, when the recognition is failed, the screen may keep dark so as to perform a dark screen fingerprint unlocking process. The display panel may further be configured to show the fingerprint recognition result. The dark screen fingerprint unlocking process may shorten the time required for fingerprint sensing and recognition, and the finger does not need to be removed from the screen during fingerprint sensing. As a result, the user experience of fingerprint recognition may be effectively improved.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the disclosure (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein.

All methods described herein can be performed in any suitable order unless otherwise indicated herein or otherwise clearly contradicted by context. The use of any and all examples, or exemplary language (e.g., "such as") provided herein, is intended merely to better illuminate the disclosure and does not pose a limitation on the scope of the disclosure unless otherwise claimed. No language in the specification should be construed as indicating any non-claimed element as essential to the practice of the disclosure.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A control circuit, coupled to a system processor and a display panel, comprising: a touch control circuit, configured to detect a finger touch on the display panel; a display control circuit, configured to control the display panel to display at least one light spot which indicates a position of the finger touch; and a fingerprint control circuit, configured to perform fingerprint sensing through at least one fingerprint sensor corresponding to the position of the finger touch, and send fingerprint image data to the system processor, wherein the fingerprint image data corresponds to sensing signals received from the at least one fingerprint sensor; wherein each of the above steps is performed by the control circuit by keeping a display part the system processor in a sleep status.

2. The control circuit of claim 1, wherein the fingerprint control circuit is further configured to:
provide an interrupt signal for awaking a fingerprint part of the system processor prior to finishing the fingerprint sensing.

3. The control circuit of claim 2, wherein the fingerprint control circuit is further configured to:
provide the interrupt signal for awaking the fingerprint part of the system processor prior to starting the fingerprint sensing.

4. The control circuit of claim 1, wherein the fingerprint control circuit is further configured to:
provide an interrupt signal for awaking a fingerprint part of the system processor after finishing the fingerprint sensing.

5. The control circuit of claim 1, wherein the fingerprint control circuit is woken up or notified by the touch control circuit and permitted by the system processor to start performing the fingerprint sensing through the at least one fingerprint sensor.

6. The control circuit of claim 1, wherein the fingerprint control circuit is woken up or notified by the touch control circuit to start performing the fingerprint sensing through the at least one fingerprint sensor without permission of the system processor.

7. The control circuit of claim 1, wherein in the sleep status, the control circuit does not receive image information related to the at least one light spot from the system processor.

8. The control circuit of claim 7, wherein the image information related to the at least one light spot comprises position information of the at least one light spot.

9. The control circuit of claim 1, wherein the display control circuit is further configured to control a backlight source and/or brightness of the display panel to display the at least one light spot without being instructed by the display part of the system processor.

10. The control circuit of claim 1, wherein when the touch control circuit determines that the finger touch is valid, the touch control circuit is configured to awake or notify the display control circuit to display the at least one light spot.

11. The control circuit of claim 10, wherein the touch control circuit is configured to determine whether the finger touch is valid based on at least one of a touch sensing area, a touch signal strength and a predetermined touch gesture.

12. The control circuit of claim 1, wherein the touch control circuit is configured to detect the finger touch in a low power wakeup gesture (LPWG) operation.

13. The control circuit of claim 1, wherein the touch control circuit is configured to detect whether there is a touch on the display panel in a first touch detection mode, and determine the position of the finger touch in a second touch detection mode after it detects that there is a touch on the display panel, wherein the second touch detection mode consumes more power than the first touch detection mode.

14. The control circuit of claim 1, wherein when fingerprint recognition of the system processor indicates a failure result, the display part of the system processor remains in the sleep status such that the display control circuit is not configured to drive the display panel to display the failure result, and the touch control circuit is configured to restart detecting a finger touch on the display panel.

15. The control circuit of claim 14, wherein the touch control circuit is configured to restart the detection by detecting whether there is a touch on the display panel.

16. The control circuit of claim 15, wherein the touch control circuit is configured to restart the detection by detecting a touched position of the touch on the display panel.

17. The control circuit of claim 1, wherein after the system processor completes fingerprint recognition based on the fingerprint image data, the display part of the system processor is configured to be changed to an awake status such that the display control circuit is configured to drive the display panel to display a fingerprint recognition result.

18. The control circuit of claim 17, wherein when the fingerprint recognition indicates a failure result, the fingerprint control circuit restarts to perform fingerprint sensing under the awake status of the display part of the system processor.

19. The control circuit of claim 17, wherein a display resume sequence is performed when the display part of the system processor is changed to the awake status.

20. The control circuit of claim 19, wherein the display control circuit is configured to start the display resume sequence after receiving the fingerprint recognition result from the system processor.

21. The control circuit of claim 19, wherein the display control circuit is configured to start the display resume sequence before receiving the fingerprint recognition result from the system processor.

22. The control circuit of claim 21, wherein the display resume sequence is completed at the time when the fingerprint recognition result is received by the control circuit.

23. The control circuit of claim 17, wherein after the fingerprint control circuit completes the step of performing fingerprint sensing, the display control circuit is configured to drive the display panel to display the fingerprint recognition result without performing a display resume sequence.

24. The control circuit of claim 1, wherein the touch control circuit is configured to determine whether the finger touch stays on the display panel during the step of performing fingerprint sensing.

25. The control circuit of claim 24, wherein the fingerprint control circuit is further configured to stop performing the fingerprint sensing when the touch control circuit detects that the finger touch leaves the display panel.

26. A method of controlling a display panel for a control circuit, the control circuit coupled to a system processor, the method comprising:
  detecting a finger touch on the display panel;
  controlling the display panel to display at least one light spot which indicates a position of the finger touch;
  performing fingerprint sensing through at least one fingerprint sensor corresponding to the position of the finger touch; and
  sending fingerprint image data to the system processor, wherein the fingerprint image data corresponds to sensing signals received from the at least one fingerprint sensor;
  wherein each of the above steps is performed by the control circuit by keeping a display part of the system processor in a sleep status.

27. The method of claim 26, further comprising:
  providing an interrupt signal for awaking a fingerprint part of the system processor prior to finishing the fingerprint sensing.

28. The method of claim 27, wherein the step of providing the interrupt signal for awaking the fingerprint part of the system processor prior to finishing the fingerprint sensing comprises:
  providing the interrupt signal for awaking the fingerprint part of the system processor prior to starting the fingerprint sensing.

29. The method of claim 26, further comprising:
  providing an interrupt signal for awaking a fingerprint part of the system processor after finishing the fingerprint sensing.

30. The method of claim 26, further comprising:
  waking up or notifying a fingerprint control circuit of the control circuit, wherein the fingerprint control circuit is permitted by the system processor to start performing the fingerprint sensing through the at least one fingerprint sensor.

31. The method of claim 26, further comprising:
  waking up or notifying a fingerprint control circuit of the control circuit, wherein the fingerprint control circuit starts performing the fingerprint sensing through the at least one fingerprint sensor without permission of the system processor.

32. The method of claim 26, further comprising:
  not receiving image information related to the at least one light spot from the system processor in the sleep status.

33. The method of claim 32, wherein the image information related to the at least one light spot comprises position information of the at least one light spot.

34. The method of claim 26, further comprising:
  controlling a backlight source and/or brightness of the display panel to display the at least one light spot without being instructed by the display part of the system processor.

35. The method of claim 26, further comprising:
  awaking or notifying a display control circuit of the control circuit to display the at least one light spot when the finger touch is determined to be valid.

36. The method of claim 35, wherein the step of detecting the finger touch on the display panel comprises:
  determining whether the finger touch is valid based on at least one of a touch sensing area, a touch signal strength and a predetermined touch gesture.

37. The method of claim 26, wherein the step of detecting the finger touch on the display panel comprises:
  detecting the finger touch in a low power wakeup gesture (LPWG) operation.

38. The method of claim 26, wherein the step of detecting the finger touch on the display panel comprises:
  detecting whether there is a touch on the display panel in a first touch detection mode; and
  determining the position of the finger touch in a second touch detection mode after detecting that there is a touch on the display panel;
  wherein the second touch detection mode consumes more power than the first touch detection mode.

39. The method of claim 26, wherein when fingerprint recognition of the system processor indicates a failure result, the display part of the system processor remains in the sleep status such that the control circuit is not configured to drive the display panel to display the failure result, and the method further comprises:
  restarting detecting a finger touch on the display panel.

40. The method of claim 39, wherein the step of restarting detecting the finger touch on the display panel comprises:
restarting the detection by detecting whether there is a touch on the display panel.

41. The method of claim 40, wherein the step of restarting detecting the finger touch on the display panel further comprises:
restarting the detection by detecting a touched position of the touch on the display panel.

42. The method of claim 26, wherein after the system processor completes fingerprint recognition based on the fingerprint image data, the display part of the system processor is configured to be changed to an awake status such that the control circuit is configured to drive the display panel to display a fingerprint recognition result.

43. The method of claim 42, further comprising:
restarting to perform fingerprint sensing under the awake status of the display part of the system processor when the fingerprint recognition indicates a failure result.

44. The method of claim 42, wherein a display resume sequence is performed when the display part of the system processor is changed to the awake status.

45. The method of claim 44, further comprising:
starting the display resume sequence after receiving the fingerprint recognition result from the system processor.

46. The method of claim 44, further comprising:
starting the display resume sequence before receiving the fingerprint recognition result from the system processor.

47. The method of claim 46, wherein the display resume sequence is completed at the time when the fingerprint recognition result is received by the control circuit.

48. The method of claim 42, further comprising:
displaying the fingerprint recognition result without performing a display resume sequence after the fingerprint sensing is completely performed.

49. The method of claim 26, further comprising:
determining whether the finger touch stays on the display panel during the step of performing fingerprint sensing.

50. The method of claim 49, further comprising:
stopping performing the fingerprint sensing when detecting that the finger touch leaves the display panel.

51. A display system, comprising:
a display panel;
a system processor; and
a control circuit, coupled to the system processor and configured to control the display panel, configured to:
detect a finger touch on the display panel;
control the display panel to display at least one light spot which indicates a position of the finger touch; and
perform fingerprint sensing through at least one fingerprint sensor corresponding to the position of the finger touch, and send fingerprint image data to the system processor, wherein the fingerprint image data corresponds to sensing signals received from the at least one fingerprint sensor;
wherein each of the above steps is performed by the control circuit by keeping a display part of the system processor in a sleep status.

52. The display system of claim 51, wherein the control circuit is further configured to:
provide an interrupt signal for awaking a fingerprint part of the system processor prior to finishing the fingerprint sensing.

53. The display system of claim 52, wherein the control circuit is further configured to:
provide the interrupt signal for awaking the fingerprint part of the system processor prior to starting the fingerprint sensing.

54. The display system of claim 51, wherein the control circuit is further configured to:
provide an interrupt signal for awaking a fingerprint part of the system processor after finishing the fingerprint sensing.

55. The display system of claim 51, wherein the control circuit is permitted by the system processor to start performing the fingerprint sensing through the at least one fingerprint sensor.

56. The display system of claim 51, wherein the control circuit is configured to start performing the fingerprint sensing through the at least one fingerprint sensor without permission of the system processor.

57. The display system of claim 51, wherein in the sleep status, the control circuit does not receive image information related to the at least one light spot from the system processor.

58. The display system of claim 57, wherein the image information related to the at least one light spot comprises position information of the at least one light spot.

59. The display system of claim 51, wherein the control circuit is further configured to control a backlight source and/or brightness of the display panel to display the at least one light spot without being instructed by the display part of the system processor.

60. The display system of claim 51, wherein when the control circuit determines that the finger touch is valid, the control circuit is configured to display the at least one light spot.

61. The display system of claim 60, wherein the control circuit is configured to determine whether the finger touch is valid based on at least one of a touch sensing area, a touch signal strength and a predetermined touch gesture.

62. The display system of claim 51, wherein the control circuit is configured to detect the finger touch in a low power wakeup gesture (LPWG) operation.

63. The display system of claim 51, wherein the control circuit is configured to detect whether there is a touch on the display panel in a first touch detection mode, and determine the position of the finger touch in a second touch detection mode after it detects that there is a touch on the display panel, wherein the second touch detection mode consumes more power than the first touch detection mode.

64. The display system of claim 51, wherein when fingerprint recognition of the system processor indicates a failure result, the display part of the system processor remains in the sleep status such that the control circuit is not configured to drive the display panel to display the failure result, and the control circuit is configured to restart detecting a finger touch on the display panel.

65. The display system of claim 64, wherein the control circuit is configured to restart the detection by detecting whether there is a touch on the display panel.

66. The display system of claim 65, wherein the control circuit is configured to restart the detection by detecting a touched position of the touch on the display panel.

67. The display system of claim 51, wherein after the system processor completes fingerprint recognition based on the fingerprint image data, the display part of the system processor is configured to be changed to an awake status such that the control circuit is configured to drive the display panel to display a fingerprint recognition result.

68. The display system of claim 67, wherein when the fingerprint recognition indicates a failure result, the control circuit restarts to perform fingerprint sensing under the awake status of the display part of the system processor.

69. The display system of claim 67, wherein a display resume sequence is performed when the display part of the system processor is changed to the awake status.

70. The display system of claim 69, wherein the control circuit is configured to start the display resume sequence after receiving the fingerprint recognition result from the system processor.

71. The display system of claim 69, wherein the control circuit is configured to start the display resume sequence before receiving the fingerprint recognition result from the system processor.

72. The display system of claim 71, wherein the display resume sequence is completed at the time when the fingerprint recognition result is received by the control circuit.

73. The display system of claim 67, wherein after the control circuit completes the step of performing fingerprint sensing, the control circuit is configured to drive the display panel to display the fingerprint recognition result without performing a display resume sequence.

74. The display system of claim 51, wherein the control circuit is configured to determine whether the finger touch stays on the display panel during the step of performing fingerprint sensing.

75. The display system of claim 74, wherein the control circuit is further configured to stop performing the fingerprint sensing when the control circuit detects that the finger touch leaves the display panel.

76. A control circuit, coupled to a system processor and a display panel, comprising: a touch control circuit, configured to detect a finger touch on the display panel; a display control circuit, configured to control the display panel to display at least one light spot which indicates a position of the finger touch without intervention of a display part of the system processor; and a fingerprint control circuit, configured to perform fingerprint sensing through at least one fingerprint sensor corresponding to the position of the finger touch, and send fingerprint image data to the system processor, wherein the fingerprint image data corresponds to sensing signals received from the at least one fingerprint sensor.

77. The control circuit of claim 76, wherein the touch control circuit is configured to detect the finger touch and the display control circuit is configured to control the display panel to display the at least one light spot under a sleep status of the display part of the system processor.

78. The control circuit of claim 76, wherein the touch control circuit is configured to detect the finger touch and the display control circuit is configured to control the display panel to display the at least one light spot under a condition where the display panel is continuously kept to be dark except displaying the at least one light spot.

\* \* \* \* \*